(12) United States Patent
Anumala et al.

(10) Patent No.: US 9,288,105 B2
(45) Date of Patent: Mar. 15, 2016

(54) N-NODE VIRTUAL LINK TRUNKING (VLT) SYSTEMS FAULT MANAGEMENT

(71) Applicant: DELL PRODUCTS L.P., Round Rock, TX (US)

(72) Inventors: Mohnish Anumala, Cupertino, CA (US); Jeyasubramanian Irungola Pillai, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 65 days.

(21) Appl. No.: 14/142,362

(22) Filed: Dec. 27, 2013

(65) Prior Publication Data

US 2015/0188753 A1  Jul. 2, 2015

(51) Int. Cl.
*H04L 12/28* (2006.01)
*H04L 12/24* (2006.01)
*H04L 12/709* (2013.01)

(52) U.S. Cl.
CPC .......... *H04L 41/0668* (2013.01); *H04L 45/245* (2013.01)

(58) Field of Classification Search
CPC ....................................................... H04L 49/25
USPC ......................................................... 370/410
See application file for complete search history.

(56) References Cited

U.S. PATENT DOCUMENTS

| | | | |
|---|---|---|---|
| 7,227,837 B1 * | 6/2007 | Bi et al. | 370/217 |
| 7,719,958 B1 | 5/2010 | Azimi et al. | |
| 7,916,628 B2 * | 3/2011 | Ghosh et al. | 370/218 |
| 8,218,440 B2 * | 7/2012 | Dai | 370/235 |
| 2007/0014231 A1 | 1/2007 | Sivakumar et al. | |
| 2009/0059800 A1 | 3/2009 | Mohan | |
| 2010/0246388 A1 | 9/2010 | Gupta et al. | |
| 2011/0268125 A1 | 11/2011 | Vobbilisetty et al. | |
| 2012/0275297 A1 | 11/2012 | Subramanian | |
| 2013/0064247 A1 | 3/2013 | Song et al. | |
| 2013/0111048 A1 | 5/2013 | Tong et al. | |
| 2014/0092738 A1 | 4/2014 | Grandhi et al. | |

OTHER PUBLICATIONS

Arista, "Multi-Chassis Link Aggregation," http://www.aristanetworks.com (3pgs).

(Continued)

*Primary Examiner* — Wei Zhao

(74) *Attorney, Agent, or Firm* — North Weber & Baugh LLP

(57) ABSTRACT

Aspects of the present invention include an N-Node virtual link trunking (VLT) system comprising a set of N nodes collectively provide a logical fabric-level view that is consistent across the set of N nodes. Embodiments of the N-Node VLT system comprise a control plane mechanism to provide Layer 2 multipathing between access network devices (switches or servers) and the core network. The N-Node VLT system provides a loop-free topology with active-active load-sharing of uplinks from access to the core. Accordingly, the N-Node VLT system eliminates the disadvantage of Spanning Tree Protocol (STP) (active-standby links) by allowing link aggregation group (LAG) terminations on multiple separate distribution or core switches and also supporting a loop-free topology. Additional benefits of an N-Node VLT system include, but are not limited to, higher resiliency, improved link utilization, and improved manageability of the network.

20 Claims, 25 Drawing Sheets

(56) References Cited

OTHER PUBLICATIONS

Brocade, "Brocade Advanced VDX and VCS Fabric Management Simplified Network Operations with VCS Fabrics and Brocade Network Advisor" Dec. 2014, GA-AG-451-04 (2pgs).
Brocade, "An Introduction to Brocade VCS Fabric Technology," Mar. 2015, GA-WP-1491-08 (12pgs).
Cisco Systems Inc., "Cisco DCNM Fundamentals Guide, Cisco DCNM Fundamentals Overview" OL-25174-01, Release 5.x (4pgs).
Cisco Systems, Inc., "Cisco FabricPath," C45-605626-00, Jun. 2010 (2pgs).
Cisco Systems, Inc., Cisco Configuration Guide, "Virtual PortChannel Quick Configuration Guide," C07-543563-00, Jul. 2009 (9pgs).
Cisco Systems, Inc., "Virtual Switching System," C67-423240-05, Aug. 2009 (6pgs).
Dell, Network Architecture with Dell Active System, "Network Architecture in Dell Active System 200 & 800," (23pgs).
Dell, "Dell Force10 VLT Technical Guide Overview, Optimization, and Performance Testing" (52pgs).
Wikipedia, "IEEE 802.1 ad," http://en.wikipedia.org/wiki/IEEE_802.1ad, Mar. 8, 2015 (4pgs).
Wikipedia, "802.1AXbq—Link Aggregation Amendment: Distributed Resilient Network Interconnect," http://www.ieee802.org/1/pages/802.1axbq.html, Jan. 24, 2014 (2pgs).
Wikipedia, "Link aggregation," Mar. 23, 2015, http://en.wikipedia.org/w/index.php?title=Link_aggregation&oldid=653117556 (8pgs).
Wikipedia, "Link aggregation," http://en.m.wikipedia.org/wiki/802.3ad (14pgs).
Wikipedia, "Split multi-link trunkiing," http://en.wikipedia.org/wiki/Split_multi-link_trunking&oldid=642860248 (3pgs).
Wikipedia, "TRILL (computing)," http://en.wikipedia.org/w/index.php?title=TRILL_(computing)&oldid=652750324 (5pgs).
Wikipedia, "Virtual Cluster Switching," http://en.wikipedia.org/w/index.php?title=Virtual_Cluster_Switching&oldid=613288184 (3pgs).
Non-Final Office Action of Jun. 10, 2015, in U.S. Appl. No. 14/142,170, filed Dec. 27, 2013 (20pgs).
Response filed Sep. 2, 2015, in U.S. Appl. No. 14/142,170, filed Dec. 27, 2013 (15pgs).
Non-Final Office Action of Jun. 15, 2015, in U.S. Appl. No. 14/142,215, filed Dec. 27, 2013 (21pgs).
Response filed Sep. 2, 2015, in U.S. Appl. No. 14/142,215, filed Dec. 27, 2013 (17pgs).
Non-Final Office Action of Jun. 19, 2015, in U.S. Appl. No. 14/142,263, filed Dec. 27, 2013 (22pgs).
Response filed Sep. 2, 2015, in U.S. Appl. No. 14/142,263, filed Dec. 27, 2013 (18pgs).
Non-Final Office Action of Jul. 6, 2015, in U.S. Appl. No. 14/142,296, filed Dec. 27, 2013 (13pgs).
Response filed Sep. 2, 2015, in U.S. Appl. No. 14/142,296, filed Dec. 27, 2013 (13pgs).
Non-Final Office Action mailed Sep. 18, 2015, in related U.S. Appl. No. 14/198,602, filed Mar. 6, 2014 (23pgs).
Final Office Action dated Oct. 1, 2015, in related U.S. Appl. No. 14/142,170, filed Dec. 27, 2013, 25pgs.
Notice of Allowance dated Oct. 7, 2015, in related U.S. Appl. No. 14/142,215, filed Dec. 27, 2013, 25pgs.
Notice of Allowance dated Oct. 15, 2015, in related U.S. Appl. No. 14/142,263, filed Dec. 27, 2013, 19pgs.
Notice of Allowance dated Oct. 15, 2015, in related U.S. Appl. No. 14/142,296, filed Dec. 27, 2013, 19pgs.
Final Response dated Oct. 23, 2015, in related U.S. Appl. No. 14/142,170, filed Dec. 27, 2013, 5pgs.
Notice of Allowance mailed Nov. 6, 2015, in U.S. Appl. No. 14/142,170 (11pgs).
Non-Final Office Action mailed Nov. 23, 2015, in U.S. Appl. No. 14/142,402 (28pgs).
Response to Non-Final Office Action in U.S. Appl. No. 14/198,602, filed Dec. 18, 2015 (12 pgs).
Response to Final Office Action in U.S. Appl. No. 14/142,170, filed Oct. 23, 2015 (2 pgs).
Supplemental Notice of Allowance mailed Oct. 28, 2015, in U.S. Appl. No. 14/142,296 (7 pgs).

* cited by examiner

2000

When a VLT LAG is broken on node Nx, node Nx becomes the topology-change-owner and performs the table entry ownership change(s) — 2005

Node Nx computes the assigned node for the failed VLT LAG and installs the necessary port block masks — 2010

When the broken VLT LAG is restored, the port block masks installed to handle the VLT LAG failure are reverted back to their pre-failure states — 2015

- When an ICL link (e.g., ICL(Nx-Ny)) is broken, the VLT ports are disabled at Nx and Ny according to the one or more rules — 2105
- All of the ICL ports, except one, are disabled at one of the nodes (e.g., Nx) — 2110
- The node (e.g., Nx) is then moved out of the VLT system — 2115
- Since the topology has changed, the assigned nodes are recomputed — 2120
- To avoid potential loops, while changing the assigned nodes, the existing port blocks are opened only after the new blocks are installed first — 2125
- The node that is retained in the VLT system (e.g., Ny) is the topology-change-owner and changes ownership of affected table entries to an existing node — 2130
- When the broken link is restored, the prior settings are restored and the removed node (e.g., Nx) is included in N-Node VLT system again — 2135

2205 — Responsive to the topology changing, the assigned nodes are recomputed by all the nodes

2210 — When the node failure is detected, the node meeting a criterion or criteria (e.g., the node with the lowest MAC address) becomes the topology-change-owner and changes the ownership of the affected table entries

2215 — To avoid potential loops, while changing the assigned nodes, the existing port blocks are opened only after the new blocks are installed first

2220 — Responsive to the failed node being restored and included in the N-Node VLT system, the assigned nodes are computed again

FIGURE 22

N-NODE VIRTUAL LINK TRUNKING (VLT) SYSTEMS FAULT MANAGEMENT

CROSS-REFERENCE TO RELATED APPLICATIONS

This patent application is related in subject matter to co-pending and commonly-owned U.S. patent application Ser. No. 14/142,170, filed on Dec. 27, 2013, entitled "N-Node Virtual Link Trunking (VLT) Systems and Methods," and listing Anoop Ghanwani, Krishnamurthy Subramanian, Pathangi Janardhanan, Shivakumar Sundaram, and Mohnish Anumala as inventors, which patent document is incorporated by reference herein in its entirety and for all purposes.

This patent application is also related in subject matter to co-pending and commonly-owned U.S. patent application Ser. No. 14/142,215, filed on Dec. 27, 2013, entitled "N-Node Virtual Link Trunking (VLT) Systems Control Plane," and listing Mohnish Anumala and Jeyasubramanian Irungola Pillai as inventors, which patent document is incorporated by reference herein in its entirety and for all purposes.

This patent application is also related in subject matter to co-pending and commonly-owned U.S. patent application Ser. No. 14/142,263, filed on Dec. 27, 2013, entitled "N-Node Virtual Link Trunking (VLT) Systems Data Plane," and listing Anoop Ghanwani, Krishnamurthy Subramanian, Pathangi Janardhanan, Shivakumar Sundaram, Mohnish Anumala, and Avinash Natarajan, as inventors, which patent document is incorporated by reference herein in its entirety and for all purposes.

This patent application is also related in subject matter to co-pending and commonly-owned U.S. patent application Ser. No. 14/142,296, filed on Dec. 27, 2013, entitled "N-Node Virtual Link Trunking (VLT) Systems Management Plane," and listing Mohnish Anumala, Jeyasubramanian Irungola Pillai, and George Azzi as inventors, which patent document is incorporated by reference herein in its entirety and for all purposes.

This patent application is also related in subject matter to co-pending and commonly-owned U.S. patent application Ser. No. 14/142,402, filed on Dec. 27, 2013, entitled "Routing in Spine-Leaf Networking Systems," and listing Anoop Ghanwani, Krishnamurthy Subramanian, Pathangi Janardhanan, Shivakumar Sundaram, and Mohnish Anumala as inventors, which patent document is incorporated by reference herein in its entirety and for all purposes.

BACKGROUND

1. Field of Invention

The present invention relates generally to data communication networks and devices, and relates more particularly to multi-chassis link aggregation groups.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable. One method used to improve reliability is to provide redundant links between network devices. By employing redundant links, network traffic between two network devices that would normally be interrupted can be re-routed to the back-up link in the event that the primary link fails.

Although having redundant links is helpful for failover situations, it creates network loops, which can be fatal to networks. To remove the loops, a protocol named Spanning Tree Protocol (STP) is often employed. STP is a Layer-2 protocol that runs on network devices, such as bridges and switches, to ensure that loops are not created when there are redundant paths in the network. The result of the STP is that some links are inactive unless a primary link fails. Thus, networks using redundant links with STP have links that are underutilized.

FIG. 1 depicts an example of a networking system 100 that employs Spanning Tree Protocol. Depicted in FIG. 1 is a set of networking devices 105A-105D that are connected to other networks devices 110A and 110B (which may be access switches), which are in turn connected to other network devices 115A and 115B (which may be core switches or routers). The network devices are connected with redundant links. Due to STP, some of the links are active 120 and some of the links are placed into an inactive state 125 to avoid network loops. Because many of the links are placed into an inactive state by the STP, the network capacity is underutilized. To address the limitations of STP, a protocol called the multiple spanning tree protocol (MSTP) was developed by IEEE 802.1 [IEEE 802.1s]. While this protocol allows for more links to be used for forwarding, it still suffers from the limitation of having a loop-free active topology for any given VLAN.

However, ever increasing demands for data have required communication networks to provide more throughput. Not only must networks be reliable, but they must also provide adequate bandwidth. Thus, a key area in which communication networks strive to improve is in increasing capacity (data throughput or bandwidth).

One way to increase capacity through recapturing unused network capacity involves the use of link aggregation. Link aggregation refers to various methods of aggregating network connections to increase data throughput while still supporting fault tolerance in case of failures. Generally, link aggregation involves grouping two or more physical data network links between two network devices into one logical link in which the two or more physical network links may be treated as a single logical link. By using certain link aggregation implementations, the need for STP can be eliminated by increasing the intelligence of network forwarding devices, providing a non-blocking high performance network.

Initial implementation of link aggregation required that the aggregated links terminate on a single switch. However, additional implementation developed that allowed the links to terminate on two switches. An example of a mechanism used to support LAG networking across more than one device is multi-chassis link aggregation ("MLAG") and distributed resilient network interconnect (DRNI) [IEEE P802.1AX-REV].

MLAG is a LAG implementation in which a LAG terminates on two separate chassis or devices. A MLAG is configured such that one or more links comprising one LAG terminate at ports on a first device and one or more links comprising the same LAG terminate on a second device. The first and second devices are configured so that they appear to the surrounding network to be one logical device. At least one standard for link aggregation has been promulgated by the Institute of Electrical and Electronic Engineers, which is contained in the IEEE 802.1AX-2008 standard, which is incorporated by reference herein. However, a number of different vendors have implemented their own versions. For example, Cisco markets EtherChannel and Port Aggregation Protocol (along with its related Virtual Switching System (VSS), virtual PortChannel (vPC), Multichassis EtherChannel (MEC), and Multichassis Link Aggregation (MLAG)). Avaya markets Multi-Link Trunking (MLT), Split Multi-Link Trunking (SMLT), Routed Split Multi-Link Trunking (RSMLT), and Distributed Split Multi-Link Trunking (DSMLT). ZTE markets "Smartgroup" and Huawei markets "EtherTrunks". Other vendors provide similar offerings. A standard for this technology is under development in the IEEE 802.1 standards committee; the project is called distributed resilient network interconnect (DRNI).

FIG. 2 depicts an example implementation of a networking system, which is similar to the system in FIG. 1 but which employs link aggregation. Depicted in FIG. 2 is a set of networking devices 205A-205D that are connected to other networks devices 210A and 210B (which may be access switches). In the depicted example, the network devices 205A-205D are connects such that each device 205x has a link aggregation group (LAG) to the switches 210A and 210B. For example, network device 205A has two port connections 220A and 220B that together form link aggregation group 220, as shown in the physical view 200A of FIG. 2. To the network devices 205x having such a link aggregation configuration to the switches, the two switches 210A and 210B may be configured to appear as a single logical switch, as shown in the logical view 200B of FIG. 2.

As noted above, the two switches may optionally be configured to appear as a single logical switch. Multi-chassis link aggregation implementation provide special links (e.g., links 205 between switch 210A and switch 210B) that can be used to connect two separate switches together to form an aggregation switch that in some ways acts like a single larger chassis. With two chassis aggregated in this manner, when a packet arrives at one of the switches that must egress on the other switch, the first switch forwards the packet to a port associated with the special link interconnect where it is transmitted to the other device for transmission over the network.

It must be noted, however, that the current various implementations of link aggregation have serious limitations. First, the current implementations support only two switches configurations connected in a point-to-point fashion. Extending beyond two switches significantly adds complexity in connections, configuration, and operation. For example, it is relatively simple to synchronize data between two devices, but it becomes significantly more complex to synchronize between multiple devices.

Second, at any point in time, within a given aggregation switch only one switch typically operates in a primary switch role, while the remaining switch operates in a secondary role. In the primary role, the primary switch assumes control over at least some of the aggregation switch functionality. Among other things, this can involve the primary switch being responsible for running some Layer-2 network protocols (such as Spanning Tree Protocol (STP)) that assist in the operation of the switch in the network environment. The network information learned by the primary switch can be distributed as needed to the secondary switches in order to synchronize at least some of the states between the primary switch and secondary switch. While running in such as primary-secondary configuration is easy to manage, it does not efficiently utilize network resources.

Third, limiting the number of switches that form the logical switch group does not provide a readily scalable solution. Clients desiring to add infrastructure incrementally need to add pairs of devices rather than simply being able to add any number of switches. Also, clients wanting to extend their current link aggregation system cannot do so because new each switch or pair of switches forms a new domain rather than simply extending an existing domain. Thus, increasing the system involves adding separate link aggregation switch groups that must be separately managed, configured, and operated—needlessly adding complexity and administrative overhead.

Fourth, when pairing switches, vendors generally require that the devices be the same. Having mirrored devices makes it easier for vendors because it limits possible combinations; a vendor therefore does not have to make sure different products interoperate. Also, having homogeneous devices tend to force symmetry in the configuration, for which it is also simpler for vendors to develop and support. However, requiring like switches is rarely the best for clients. As data centers and networks grow, a client would prefer to purchase a single new model device rather than being forced to choose between buying an older model to pair with its current older model or to buy two new models and shelve it current older, but still operational, model. Thus, current multi-chassis link systems inhibit cost effective equipment migration plans.

Accordingly, what is needed are systems and methods that can address the deficiencies and limitations of the current multi-chassis link aggregation approaches.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

FIG. 20 depicts a method for handling a VLT LAG in an N-Node VLT system according to embodiments of the present invention.

FIG. 21 depicts a method for handling ICL link failure in an N-Node VLT system according to embodiments of the present invention.

FIG. 22 depicts a method for handling node failure in an N-Node VLT system according to embodiments of the present invention.

DESCRIPTION OF THE PREFERRED EMBODIMENTS

Figure 1:
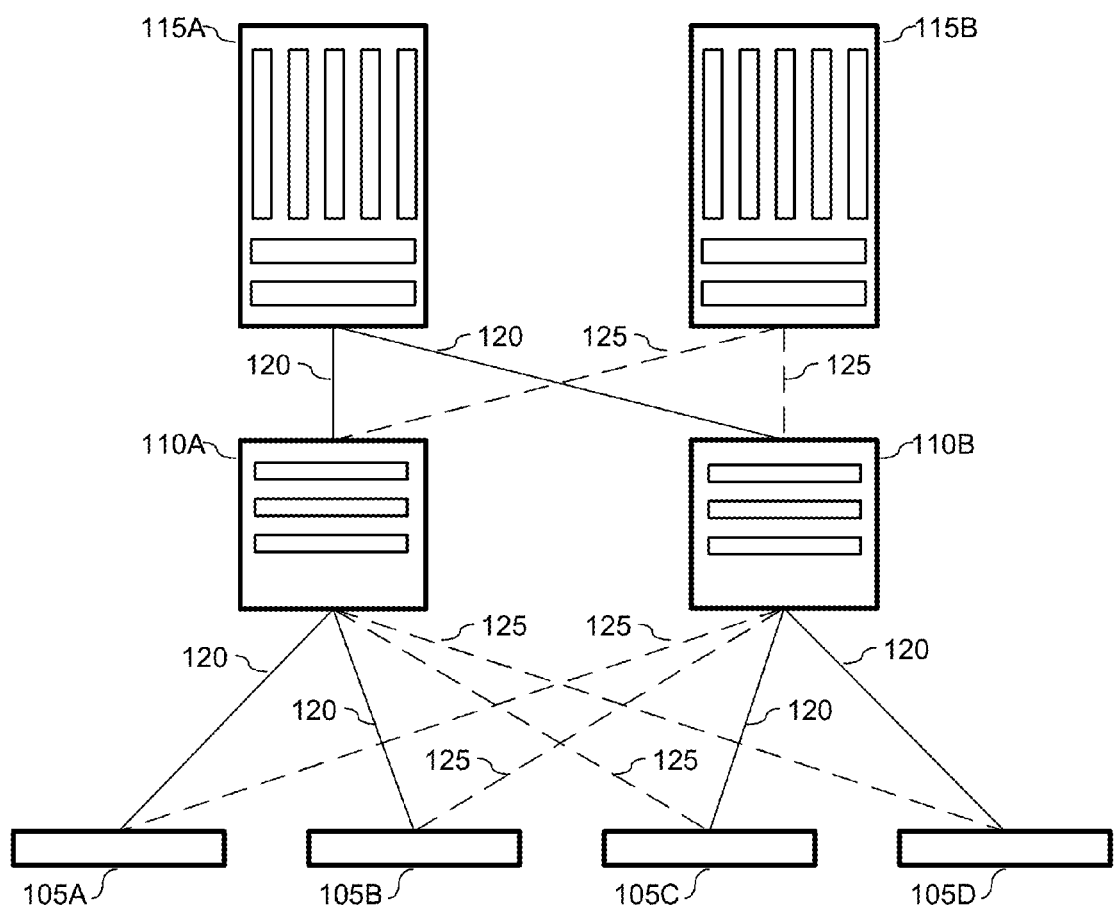
FIG. 1 depicts an example of a networking system that employs Spanning Tree Protocol.
Figure 2:
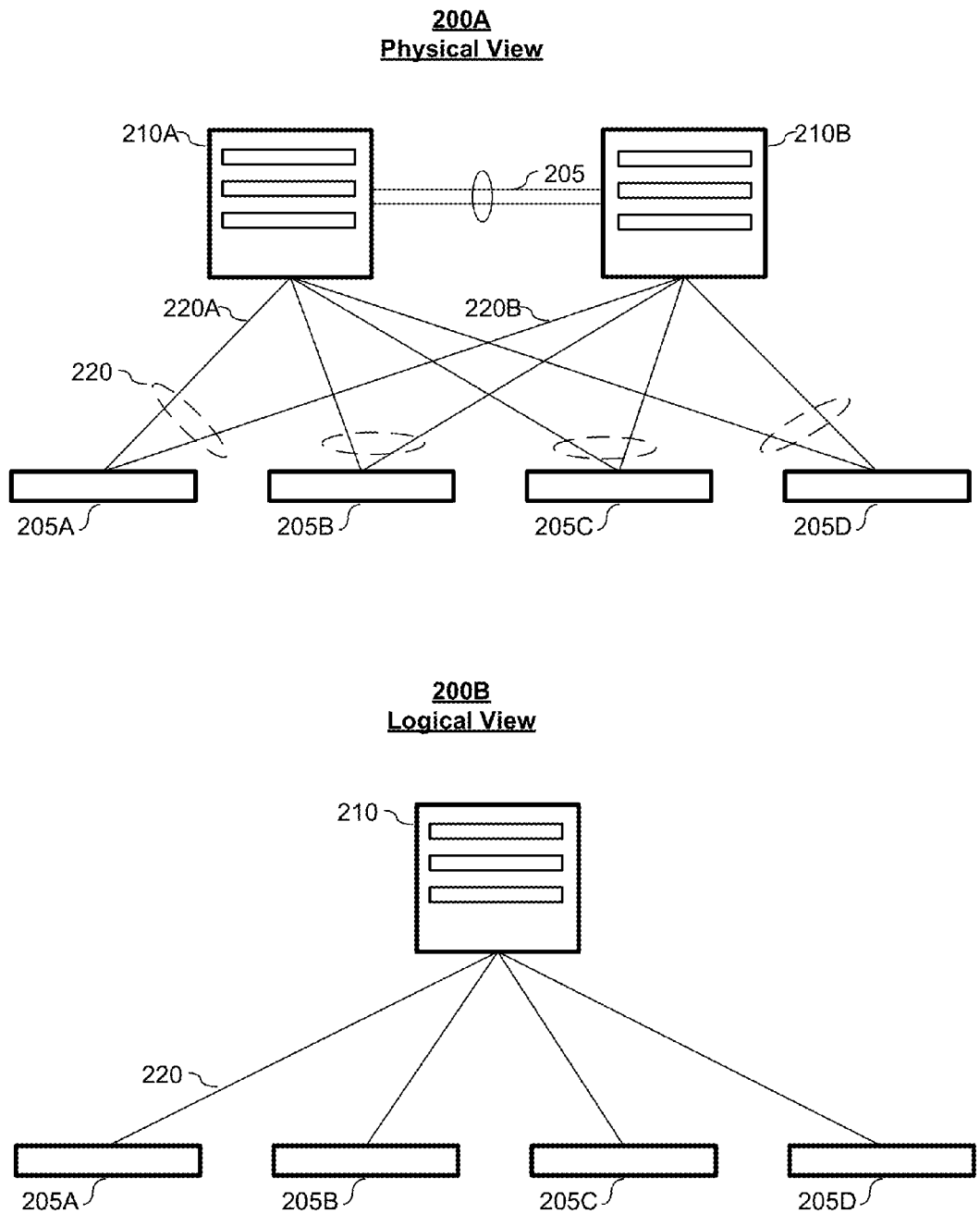
FIG. 2 depicts an example implementation of a networking system which is similar to that system in FIG. 1 but which employs link aggregation.

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks that include multi-chassis link aggregation. Such devices, systems, methods, and instructions stored on one or more non-transitory computer-readable media can result in, among other advantages, better bandwidth usage, better scalability, and better reliability by mitigating the effects of down links and other points of failure across data networks. In embodiments, a multi-chassis link aggregation may provide a group of links across multiple devices that is operated as a single link with respect to a given client device. This may be accomplished at least in part through the use of synchronizing or cross-referencing identifiers with respect to various devices, ports, and other items associated with multi-chassis link aggregation of the present invention. Such identifiers may be set forth in (by way of illustration and not limitation) layer-2 tables, layer-3 tables, or both.

The terms "packet" or "frame" shall be understood to mean a group of bits that can be transported across a network. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." One skilled in the art shall recognize that references herein to Media Access Control (MAC) address may, depending upon context, refer to MAC-VLAN combination.

It shall be noted that in the examples and embodiments provided herein the virtual link trunkings (VLTs), their members, the N-Node VLT system, and their configuration are provided for purposes of illustration and shall not be used to limit the present invention.

It shall also be noted that although embodiments described herein may be within the context of multi-chassis link aggregation, the invention elements of the current patent document are not so limited. Accordingly, the invention elements may be applied or adapted for use in other contexts.

1. INTRODUCTION

Embodiments of the present invention involve N-Node virtual link trunking (VLT) systems and methods—thereby allowing more than just two network devices to form a virtual link domain. In embodiments, a set of N nodes can collectively provide a single logical node view to one or more layer-2 (L2) LAGs that it presents to the outside nodes. In embodiments, all the nodes of the N-Node VLT system are connected with each other in full mesh (logical or physical) fashion.

In embodiments, the N-Node VLT system feature comprises a control plane mechanism to provide layer-2 multi-pathing between or among access network devices (switches or servers), between or among the core network, or both. In embodiments, the N-Node VLT system provides a loop-free topology with active-active load-sharing of uplinks from access to the core. Currently, Spanning Tree Protocols are commonly used for loop prevention in layer 2 networks. The challenge with Spanning Tree Protocols is that spanning trees block links to avoid loops resulting in less than optimum link utilization and are also difficult to manage and troubleshoot. Also, network convergence times are high with spanning trees. An N-Node VLT system eliminates the disadvantage of STP (active-standby links) by allowing LAG terminations on multiple separate distribution or core switches and also supporting a loop-free topology. Some other benefits of a VLT system include higher resiliency, improved link utilization, improved scalability, and improved manageability of the network.

As will be apparent to one of ordinary skill in the art, an N-Node VLT system has several other benefits. One benefit is that it allows a single device to use a LAG across multiple upstream devices. Second, an N-Node VLT system eliminates Spanning Tree Protocol blocked ports. Third, an N-Node VLT system provides a loop-free topology. Fourth, an N-Node VLT system is capable of using all available uplink bandwidth. Fifth, an N-Node VLT system provides fast convergence if either a link or a device fails. Sixth, an N-Node VLT system provides link-level resiliency. Seventh, an N-Node VLT system assures high availability. Eight, since the system can scale to any number of nodes, N, it is much more scalable and flexible than previous VLT systems. And ninth, because the N-Node VLT system acts effectively as a virtual switch, it can be used as a chassis replacement. One skilled in the art shall recognize other advantages.

Figure 3:
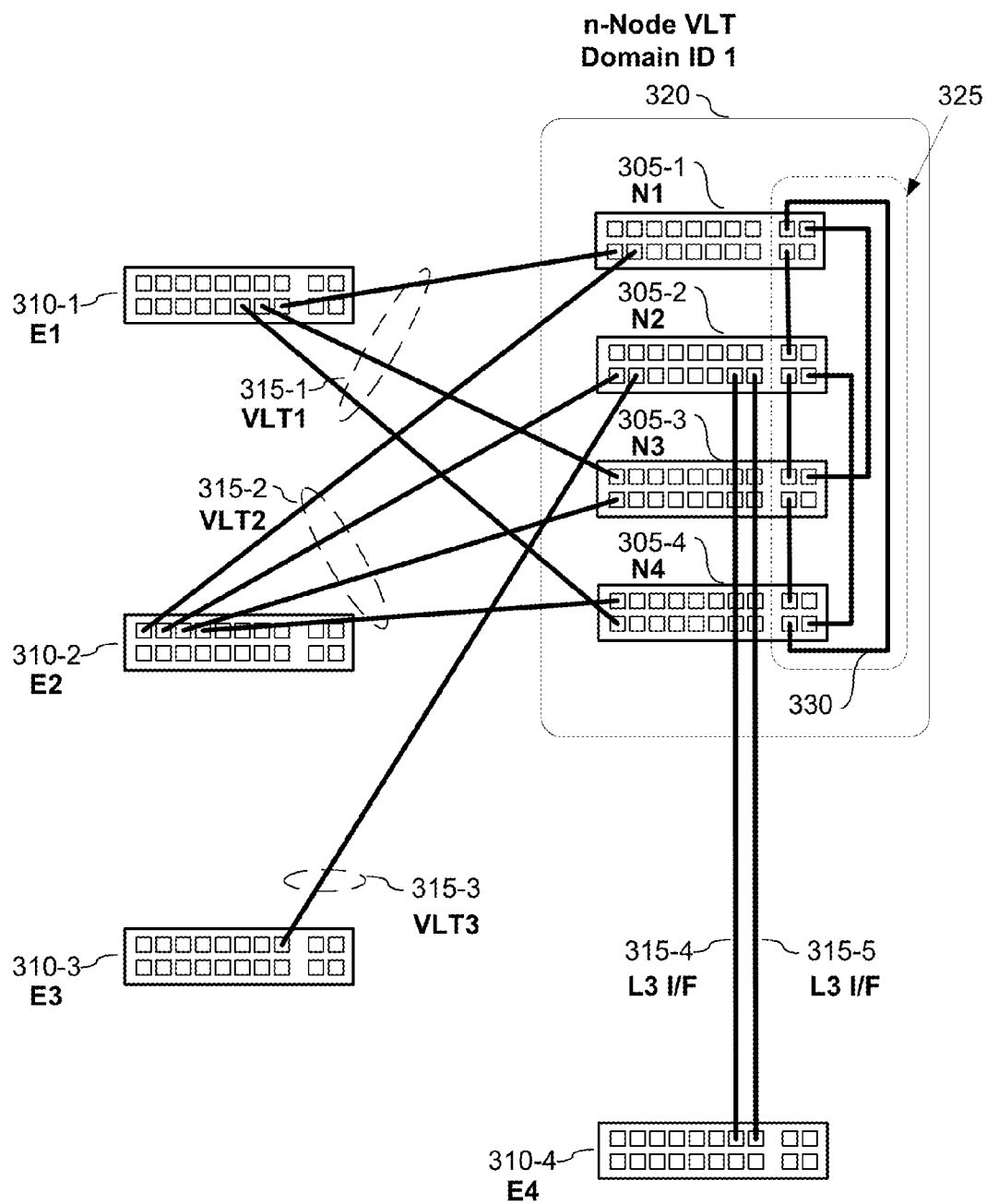
FIG. 3 depicts an example of an N-Node VLT system according to embodiments of the present invention.

FIG. 3 depicts an example embodiment of an N-Node VLT system according to embodiments of the present invention. Depicted in FIG. 3 are four nodes N1, N2, N3, and N4, which form a 4-node VLT system 320. Thus, in embodiments, an N-Node VLT system is a set of nodes that together provide a logical single node view to a L2 LAG that is connected to the nodes outside of this system. In embodiments, an N-Node VLT system may be identified by a VLT domain identifier (e.g., VLT Domain ID 1 (320) in FIG. 3).

In embodiments, the nodes need not be configured identically. Thus, for example, N1 and N2 may be configured as L3 switches. It shall be reiterated that these are example configurations and shall not be used to limit the scope of the present patent document.

In forming the N-Node VLT system, the nodes are connected via a plurality of links 325. These links may be referred to as inter-node links (INL), inter-chassis links (ICLs), or Virtual Link Trunk Interface (VLTI)—which terms may be used interchangeably herein. These links may be used to connect nodes together to form the N-Node VLT system that, in at least some ways acts, with other network devices as a single larger chassis. In embodiments, the INL links together form a mesh 325. As shown in the embodiment depicted in FIG. 3, the nodes (N1-N4) are connected in a full mesh. While the depicted embodiment is a physical full mesh, it shall be noted that the nodes may be in a logical full mesh. For example, other topologies (such as ring, daisy chain, tree, etc.) may be used but logically the nodes may be configured to be full mesh. One skilled in the art shall recognize that tunneling and/or other methods may be employed to achieve a logical full mesh. In alternative embodiments, the nodes may not be in a physical or logical full mesh configuration but may employ an alternative configuration. In forming a single logical node, the INL links may be considered analogous to backplane technology for a chassis switch; however, as will be explained in more detail below, unlike typical backplane data transfer methodologies that push much of the data traffic to the backplane, embodiment of the present invention attempt to reduce or even minimize the amount of data transmitted via the INL links.

By way of nomenclature when discussing the connection between nodes, the format "ICL(Nx-Ny)" may be used. "ICL (Nx-Ny)" means the inter-node link connecting nodes Nx and Ny. For example, ICL(N1-N4) is the link that connects node N1 with node N4, namely link 330 in FIG. 3.

Also depicted in FIG. 3 are VLT LAGs. In embodiments, a VLT LAG is a set of links that an external node uses to connect to the N-Node VLT system. To the external node this appears as a single L2 LAG. For example, as shown in FIG. 3, external node E2 310-2 has four links that together form a VLT LAG, namely VLT2 315-2. It shall be noted that the LAG may have links terminating on multiple nodes of the N-Node VLT system, as is the case for node E2, which connects to each of the four VLT nodes N1-N4. It shall also be noted that a node may have multiple links to the same node.

Thus, depicted in FIG. 3 are a number of virtual link trunks—VLT1, VLT2, and VLT3. The VLT1 comprises node N3 and N4 as members. Similarly, VLT2 comprises all nodes as its members. And, VLT3 has node N2 as its only member. Links 315-4 and 315-5 in FIG. 3 are layer-3 (L3) interfaces from device E4 and are connected to node N2. It should be noted that network devices E1-E4 may be top-of-rack switches, servers, switches, or some combination thereof.

Concerning representing VLT membership, the format VLTx {Na, . . . Nr} may be used. In embodiments, this format indicates that VLTx is a VLT LAG that has links which are up, active, and terminating on nodes Na, . . . , and Nr of the N-Node VLT system. For example, turning to FIG. 3, VLT2 membership may be represented as VLT2 {N1, N2, N3, N4}, which shows that VLT2 is a VLT LAG and has active links terminating on nodes N1, N2, N3, and N4 of the N-Node VLT system. Similarly, VLT3 may be represented at VLT3 {N2} since VLT3 has node N2 as its only member.

Additional important concepts to the operation of embodiments of the N-Node VLT system are "Local Exit" and "Assigned Node." In embodiments of the VLT system, it is preferred that traffic not be communicated via ICL links unless necessary. Thus, if traffic ingress on the VLT system on node Nx is destined for VLTz, and if that VLT has a link on node Nx, the traffic should egress through that link. It shall be noted that if the VLT has multiple links terminating on Nx, the data may be LAG distributed amongst those links.

In embodiments, a node may be assigned or designated as the node for processing certain traffic flow(s). Consider, by way of illustration, the following examples. In embodiments, if traffic ingresses on the N-Node VLT system on node Nx and is destined for VLTz, and if that VLT has no link on node Nx then there is no local exit. Assuming that VLTz has links on one or more of the other nodes in the VLT system, then one of those nodes may be designated as the assigned node for traffic for that VLT, and the traffic will be sent to that node and then send to VLTz. It shall be noted that, in embodiments, an assigned node may be specified for a "class" of traffic (e.g., for different Layer 3 interfaces in which different assigned nodes may be chosen for load balancing or other reasons). It shall also be noted that, in embodiments, the "class" of traffic may be differentiated based upon source or flow.

Figure 4:
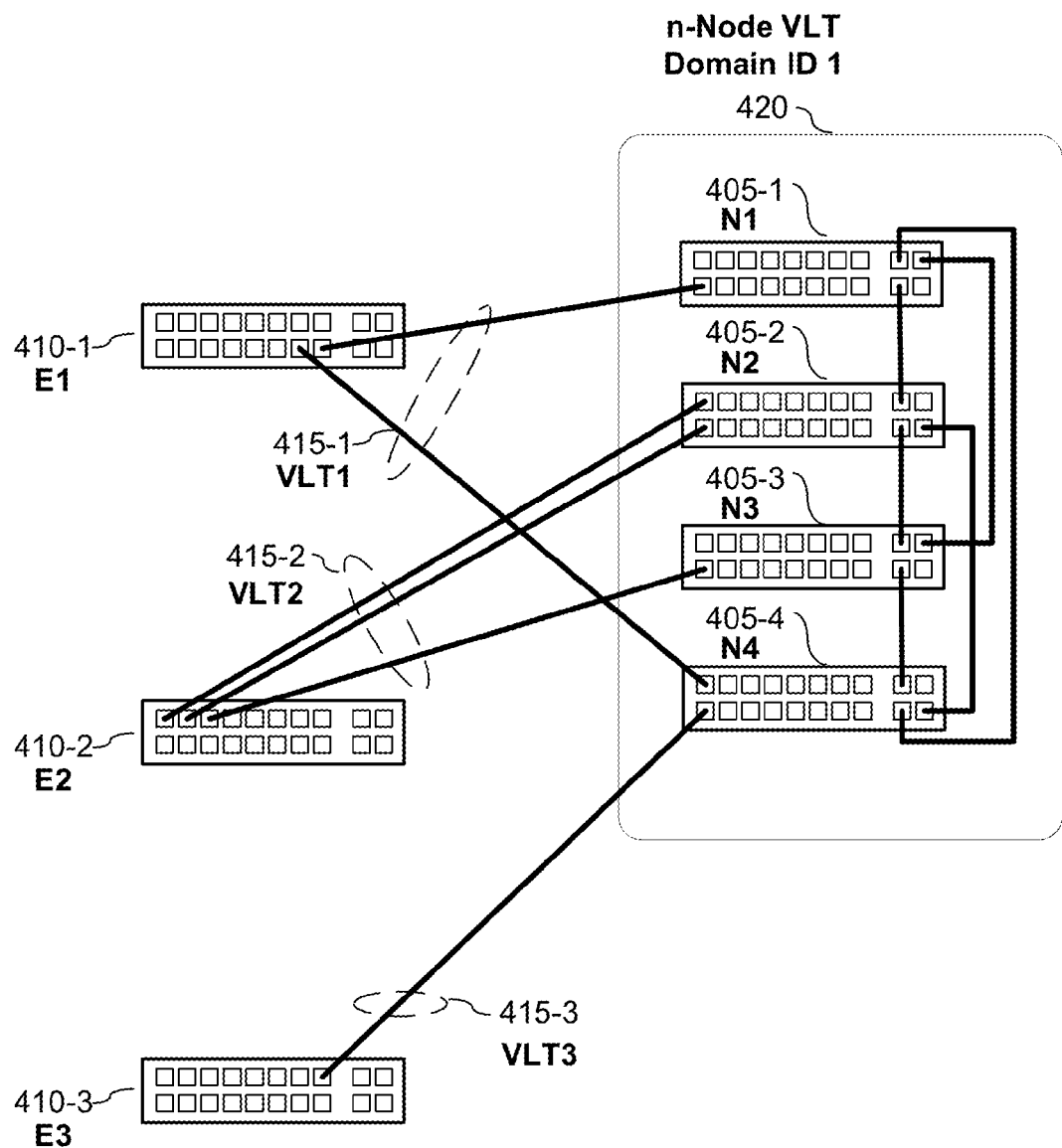
FIG. 4 depicts another example of an N-Node VLT system according to embodiments of the present invention.

Consider, by way of illustration, VLT network 400 with its four-node (N1, N2, N3, and N4) VLT system 420. As shown in FIG. 4, assume that a virtual link trunk, VLT1 415-1, comprises node members N1 405-1 and N4 405-4 (i.e., VLT1 {N1, N4}), then the following are illustrative examples of possible assigned node according to embodiments of the present invention:

N1 may be designated as the assigned node for the traffic ingressing on node N2 that is destined to VLT1 (i.e., Assigned-Node {N2–VLT1}=>N1); and N4 may be designated as the assigned node for the traffic ingressing on node N3 that is destined to VLT1 (i.e., Assigned-Node {N3–VLT1}=>N4).

In embodiments, the assigned node may all be assigned the same node or different nodes based upon the VLTx membership and one or more load distribution algorithms.

In embodiments, an N-Node VLT system may be configured with a Layer 3 (L3) interface. One of ordinary skill in the art shall recognize that this is similar to orphan ports used in a 2-Node VLT system. In embodiments, the Layer 3 interface terminates on a single node of the N-Node VLT system. Consider, by way of illustration, the network system 300 in FIG. 3. Note that network device N4 310-4 has two L3 interfaces 315-4 and 315-5 that connect to VLT node 2 305-2.

In embodiments, the N-Node VLT system 320 may include a virtual local area network (VLAN) for the node system, which may be referred to herein as an ICL-VLAN. In embodiments, an ICL-VLAN is a special internal L2 or L3 VLAN created by the N-Node VLT and all the ICL ports may be made members of that VLAN.

In embodiments, an N-Node VLT system may comprise a VLT topology change owner. Thus, in embodiments, one of the nodes may own the responsibility of assigning owners for table entries since the current owner may not be eligible to own the entry after a topology change.

In embodiments, an N-Node VLT system may comprise pre-computed updates and actions. In embodiments, an N-Node VLT system may use distributed computing to react to a topology change. Consider, by way of illustration, the following example. In the event of an ICL failure, a VLT node may not be able to get topology information from all the nodes of the VLT system. In such cases, the partly isolated node will not be able to communicate with all the nodes to take the appropriate action for the topology change. So, pre-computed updates and actions may always be computed by all the nodes for possible future ICL failures.

2. N-NODE VLT LOGICAL VIEW

Figure 5:
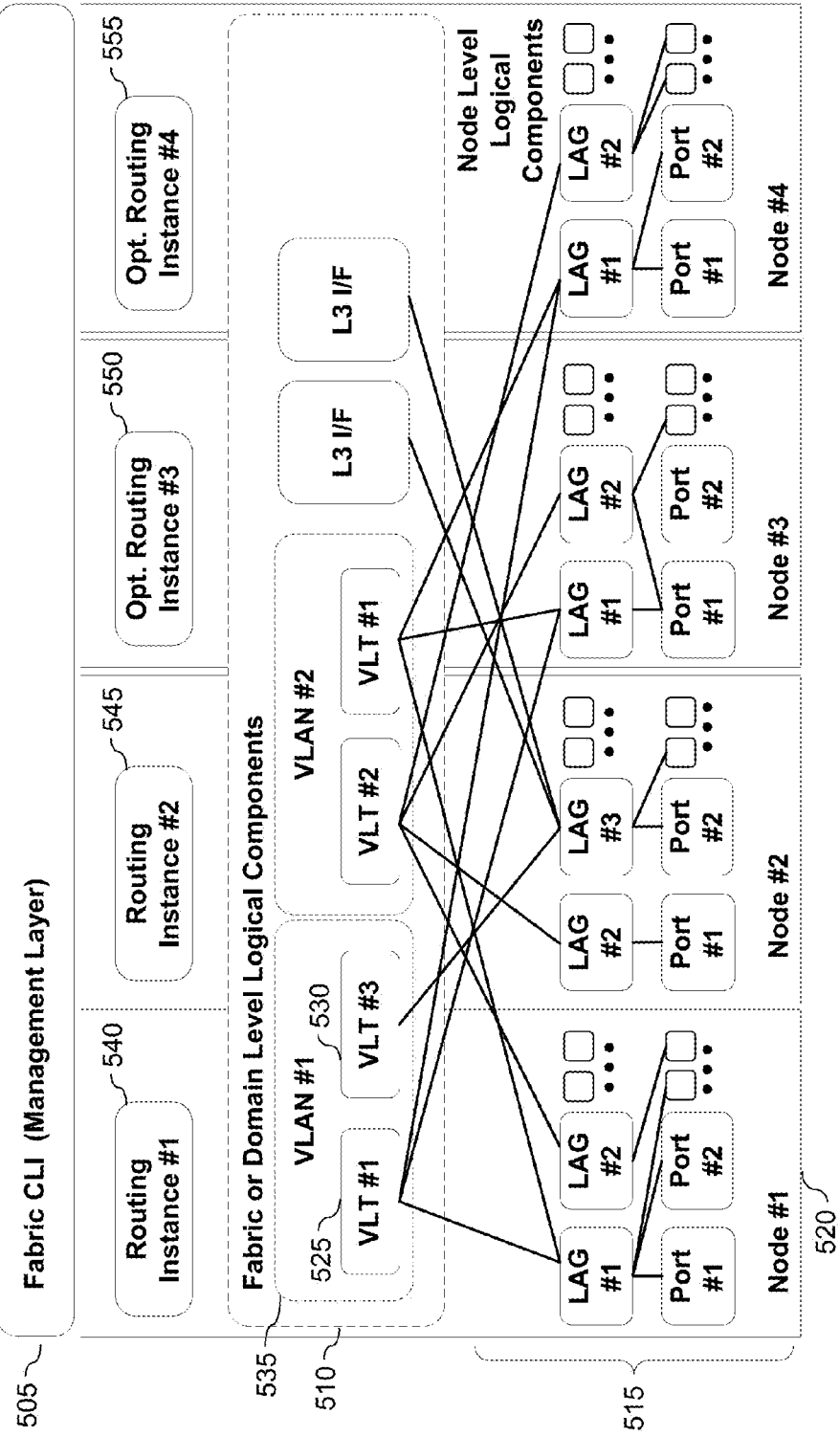
FIG. 5 depicts a logical view of an N-Node VLT system according to embodiments of the present invention.

FIGS. 3 and 4 depicted examples of physical views of N-Node VLT systems. An important aspect of embodiments of the N-Node VLT system is its logical representation, particularly as it appears to other layers in the network. FIG. 5 depicts a logical view of an N-Node VLT system according to embodiments of the present invention. For purposes of illustration, the example logical representation of FIG. 5 generally correlates to the physical view depicted in FIG. 3.

Depicted in FIG. 5 are three levels or layers: a management level 505 that may utilize a fabric command line interface (CLI) or some other fabric management interface; a fabric or domain level logical components layer 510; and a node level 515.

As shown in FIG. 5, the association of VLT #n with LAG #n of its VLT-member nodes is shown with solid lines. For example, VLT #1 comprises LAG #1 of Node #1, LAG #1 of Node #3, and LAG #1 of Node #4. In the depicted embodiment, the VLAN members of a VLAN #n are shown by grouping them inside a dashed block for the VLAN. For example, VLT #1 525 and VLT #3 530 are members of VLAN #1 535. It shall be noted that VLANs and VLTs may have a many-to-many relationship depending upon configuration. For example, in FIG. 5, note that VLT #1 is a member of VLAN #1 and is also a member of VLAN #2.

Also depicted in FIG. 5 is the component stack for each node. For example, the component stack for Node #1 is depicted as vertical stack 520. Note that the fabric/domain level logical components 510 span all the nodes.

The logical view depicts the hierarchical relationship between the modules and their level (i.e., Node level, Fabric Level, or Management Level). In embodiments, the hierarchy of the logical components may be described as follows.

a. At the Node Level

In embodiments, certain configurations occur at the node level. For example, in embodiments, the ports and LAGs are configured for a node. Thus, ports may be grouped into LAGs within a node. For example, Port #1 and Port #2 are configured as members of LAG #1 in Node #4. In embodiments, the IP addresses and routing instances may also be configured at the node level.

b. At the Domain/Fabric Level

One of the key aspects of the N-Node VLT system is the abstraction that occurs at the domain or fabric level. By have this abstraction and sharing information among nodes in the domain level, the domain level acts as glue or middleware layer between the other levels. An additional benefit to this configuration is that little, if any, changes need to occur at the node level 515 and the fabric management level 505 to support N-Node VLT functionality.

At the domain or fabric level, the logical components comprise the VLT(s), VLAN(s), and the layer 3 (L3) interface(s), and the domain numbers for these items are shared across the nodes that participate in the VLT domain. This helps enable the nodes to be seen as one entity to the node level 515 and the fabric management level 505, but still allows the nodes to be loosely coupled such that one node's failure does not adversely affect the others.

Thus, it should be noted that, in embodiments, while referring to the ports and LAGs, the node should be mentioned to identify them uniquely. This condition applies to all node level components. However, the VLT and VLAN components do not require node ID to identify them uniquely. This condition applies to all fabric level components (e.g., VLT, VLAN, and L3 interface).

As shown in FIG. 5, in embodiments, a LAG or LAGs from nodes form a VLT LAG, and the ICL links between the nodes provide mesh connectivity, which is preferably full logical or physical mesh connectivity. As previously noted, in embodiments, the VLTs may be configured to be members of specific VLANs. In embodiments, the ICL links are configured as member of all VLANs defined in the VLT system.

In embodiments, one or more interfaces to a node may be configured as L3 interfaces. To provide resiliency for L3 forwarding, in embodiments, an ICL-VLAN may be created and all the ICL ports may be configured to be members of that VLAN.

In embodiments, one or more nodes may include a routing instance. In embodiments, a node that does not have any L3 interfaces (excluding ICL-VLAN) need not have a routing instance.

It shall be noted that, while it is possible to have routing instances for all the nodes, it is not necessary. In embodiments, it is beneficial to have routing instances in two nodes of a VLT system for redundancy. FIG. 5 depict an embodiment in which routing instances (routing instance #1 540 and routing instance #2 545) operate in two nodes (Node #1 and Node #2, respectively) of an N-Node VLT system 500. Since, in embodiments, the two routing instances exist at the same IP interface, they both have the same view of the network space and are, effectively, parallel routing. In embodiments, additional routing instances may exist on other nodes (e.g., routing instances #3 550 and #4 555).

In the depicted embodiment of FIG. 5 that comprises two routing instances (routing instance #1 540 and routing instance #2 545), all VLANs may participate in these two routing instances. In embodiments, one of the two nodes with a routing instance may be identified as primary node. In embodiments, both the nodes synchronize their forwarding information base (FIB) table entries wherever applicable, and the primary node may provide the complete FIB table to other nodes which do not have a routing instance. Then, in case of a primary node failure, a secondary node may assume the role of primary node.

In embodiments, a fabric manager may use the ICL as a fabric to exchange VLT control packets among the other nodes. From a VLT control plane point of view, the ICL mesh appears like a fabric to reach all the nodes.

As these components work across the nodes, the fabric level components are able to configure the switch to handle various failure conditions and take appropriate action.

3. N-NODE VLT SWITCH HIGH LEVEL DESIGN

Figure 6:
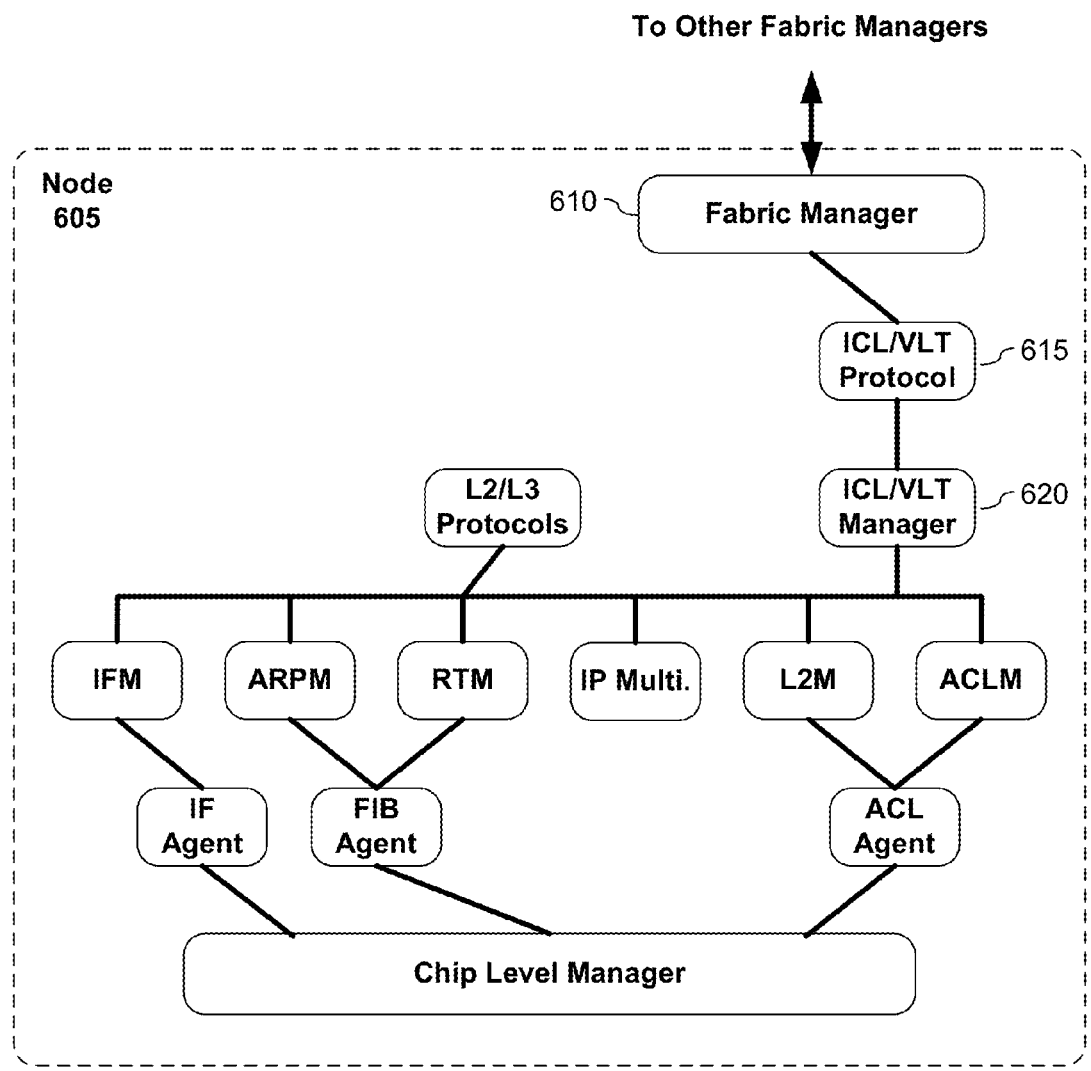
FIG. 6 depicts a high level view of a node in an N-Node VLT system according to embodiments of the present invention.

Turning now to FIG. 6, depicted is a high level view of a switch design as a node in an N-Node VLT system according to embodiments of the present invention. The N-Node VLT functionality may be implemented within a node 605 via the addition of a fabric manager 610, an ICL/VLT protocol module 615, and an ICL/VLT manager 620 with existing modules. By way of illustration and not limitation, the fabric manager may be part of a Force10 Operating System (FTOS) fabric manager, which is available from Dell Force10 of San Jose, Calif. In embodiments, these modules 610, 615, and 620 interact with existing L2/L3 protocol modules and table management modules via existing and/or extended module interfaces, as is well known to those of ordinary skill in the art. Those existing modules include, but are not necessarily limited to: interface manager (IFM), interface (IF) agent, Address Resolution Protocol manager (ARPM), Forwarding Information Base (FIB) agent, Routing Table Manager (RTM), Layer 2 manger, IP Multicast manager, Access Control List (ACL) manager (ACLM), ACL agent, and chip layer manager(s). The functionality of the fabric manager 610, the ICL protocol module 615, and the ICL/VLT manager 620 are explained in more detail below.

4. FABRIC MANAGEMENT PLANE

In embodiments, a fabric management plane provides a centralized management interface for the entire cluster of the N-Node VLT deployment.

In embodiments, this is achieved by having a single switch fabric master accessible via a virtual IP address (VIP) and N−1 fabric standby nodes. The fabric master is responsible for providing the external management interfaces (CLI, REST, etc.) that are used by third-party management applications and clients.

In embodiments, the fabric master may support the following functions: (1) Fault, Configuration, Monitoring, Security and Logging; (2) Database synchronization with fabric standby nodes; (3) Transaction-based configuration with commit/rollback capability across all the nodes in the fabric cluster; (4) Take a single fabric level configuration transaction and break it down into multiple configuration requests to all the applicable nodes in the cluster (uses existing node level CLI/REST interfaces); (5) Single point of management for the entire fabric cluster via Virtual IP address; and (6) Election mechanism to identify the node in the cluster that is best suited to be master. One skilled in the art shall recognize that the fabric manager may support fewer or more functions.

Concerning election, one skilled in the art shall recognize that a number of election mechanisms may be employed, which may include nodes in an n-node VLT system negotiating who is to be master (or an owner) based upon one or more criteria. For example, in embodiments, nodes may negotiate who is master based upon a hierarchy of criteria in which the node with the highest priority ID is selected. If nodes have the same priority ID or no priority ID, then selection may be based upon MAC address (e.g., lowest MAC address is selected). And, in embodiments, if the nodes have the same MAC address (such as a virtual MAC) then the first node that is operational may be selected. Also, in embodiments, if a node has two or more controller cards, it may internally negotiate which should be the master; and if need be, after having selected an intra-node master, negotiate with external nodes to decide a master between the nodes.

In embodiments, from the user's perspective the following VLT fabric entities are configurable to setup an N-Node VLT system:

TABLE 1

| ENTITY | IDENTIFIER | CONFIGURATION PARAMETER |
|---|---|---|
| Domain | Domain ID | System MAC |
| Nodes | Node ID | Priority, Management Port ID & its IP address/Mask, Default Route |
| Port-Channels | Port Channel ID | List of Ports, Type (ICL/VLT), Mode (Trunk, Access), List of Ports, List of VLANs |
| ICLs | ICL ID | Node Pair, Port Channel ID |
| VLTs | VLT ID | List of Ports, Port Channel ID |

Figure 7A:
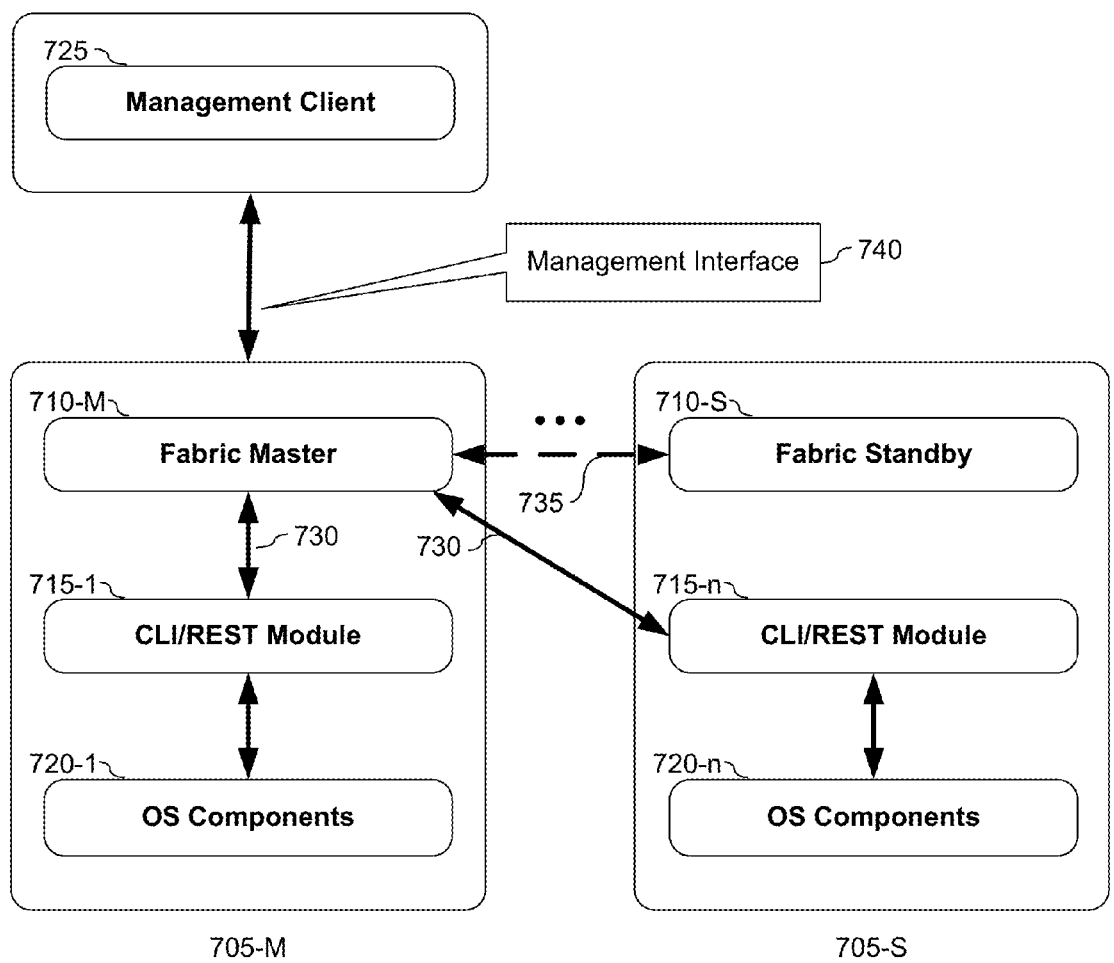
FIG. 7A depicts a fabric management plane configuration system and the flow of information from the external/remote management client through to individual switch network OS components in an N-Node VLT system according to embodiments of the present invention.

FIG. 7A depicts a fabric management plane configuration system and the flow of information from the external/remote management client through to individual switch network OS components 720 in an N-Node VLT system according to embodiments of the present invention. FIG. 7A shows a management client 725 that is communicatively coupled to an N-Node VLT system to provide fabric-level management capabilities. Also depict in FIG. 7A are a plurality of nodes (for sake of brevity only two nodes (705-M and 705-S) are illustrated) of the N-Node VLT system. In embodiments, each node includes an embedded fabric management client component (710), a command line interface (CLI)/Representational State Transfer (REST) module 715 that interfaces with the fabric management client module 710, and switch operating system (OS) components 720 that interface with the CLI/REST module 715. In embodiments, the OS components may be existing OS components, such as those provided in the Force10 Operating System (FTOS) by Dell Force10 of San Jose, Calif. (although other network operating systems or components may be used). Similarly, the CLI/REST module may be an existing CLI/REST module or modules. It shall be noted that, in embodiments, node-level API requests may leverage existing node-level APIs to minimize the amount of work required at the fabric management plane.

In embodiment, the management client 725 is used by an administrator/user to interface 740 with the fabric management plane to configure the N-Node VLT system with the VLT fabric level configuration parameters (e.g., Table 1 (above)).

In embodiments, one node (e.g., node 705-M) operates with a fabric master client 710-M and one or more of the remaining nodes contain a fabric standby client 710-S (e.g., node 705-S). The standby clients may be used for failover protection; thus, if the node 705-M upon which the fabric master 710-M operates fails, another node (e.g., node 705-S) may become the master, thereby providing limited or no interruption. In embodiments, the fabric master may be assigned a virtual IP address; thus, changes as to which node in the VLT system is acting as the fabric master will appear transparent.

In embodiments, the fabric management plane takes external user requests that are received at the fabric master 710-M and uses a single distributed transaction to invoke the node(s) level application programming interfaces (APIs) (command line interface (CLI)/Representational State Transfer (REST) (e.g., 715-x) in parallel to propagate the request across the cluster of nodes.

In embodiments, once the transaction is completed successfully, the fabric master 710-M will synchronize the new set of changes to all the fabric standby nodes (e.g., cluster-level database synchronization). In embodiments, the configuration changes will only be implemented once the configuration is successfully updated in each node's database. In alternative embodiments, the fabric management system may flag problems that affect the N-Node VLT system and may additionally provide alerts to such issues to the user/administrator.

In embodiments, the fabric management plane interface may additionally allow a user or administrator the ability to configure node-specific elements on one or more of the nodes in the N-Node VLT system.

It shall be noted that, in embodiments, the configuration of FIG. 7A may be adapted for or implemented as a distributed fabric configuration. In embodiments, all nodes are equal and any node may provide management interface. Thus, in embodiments, a "master" node may be the node performing a certain transaction. For example, a "master" node is a node performing a user transaction; and, in embodiments, different nodes may perform different user transactions—at different times, in parallel, or both. However, fabric-level configuration information is kept consistent and distributed to every node in the domain.

Figure 7B:
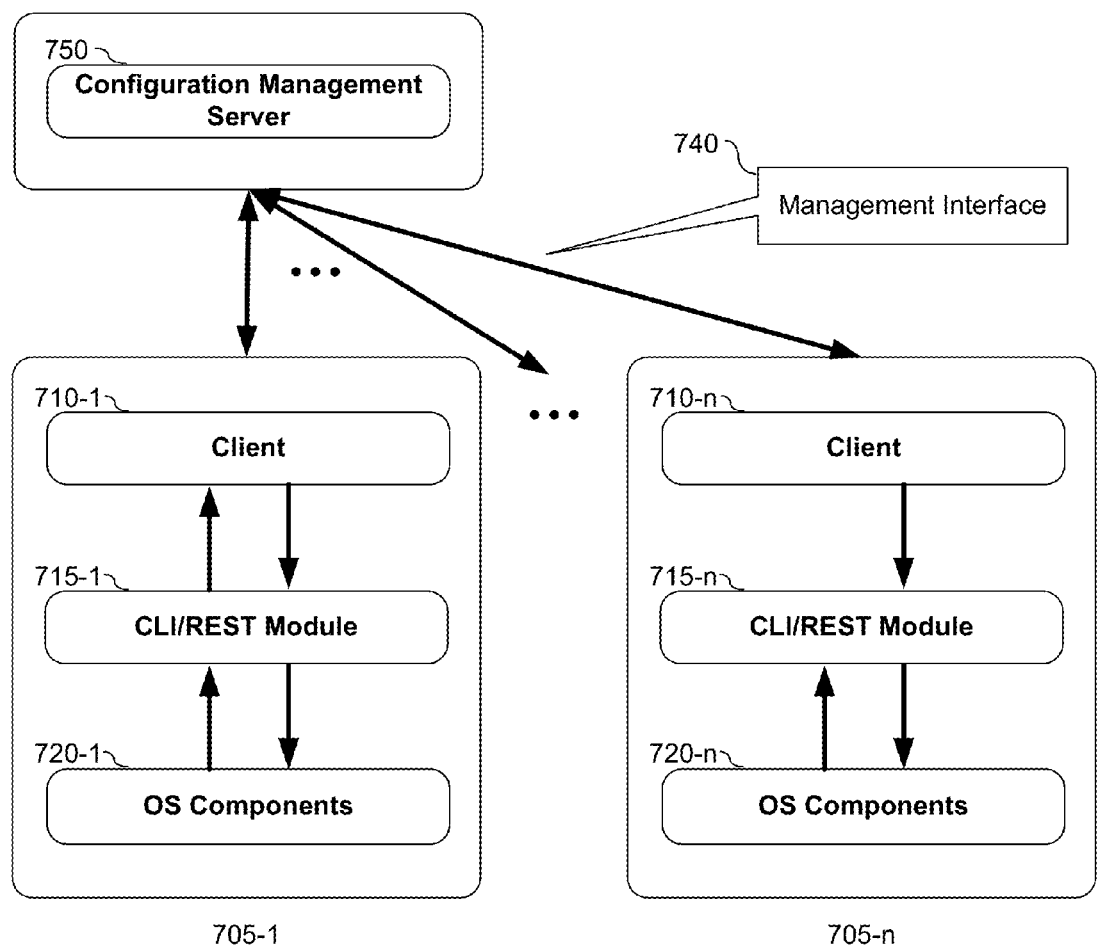
FIG. 7B depicts an alternative fabric management system according to embodiments of the present invention.

FIG. 7B depicts an alternative fabric management system according to embodiments of the present invention. From a system perspective, the configuration parameters (e.g., Table 1) may be converted into the node level and fabric level parameters. In embodiments, the node level parameters may be configured by configuration management server, such as (by way of illustration and not limitation) NETCONF, through a management interface (e.g., 740) of the node. It shall be noted that these nodes are able to act independently as peer nodes.

In embodiments, the client (710) of the nodes maintains the session with the configuration management server (750) through the management interface. The client decodes the configuration data and protocol messages and configures the node through the existing CLI module interface 715.

Figure 7C:
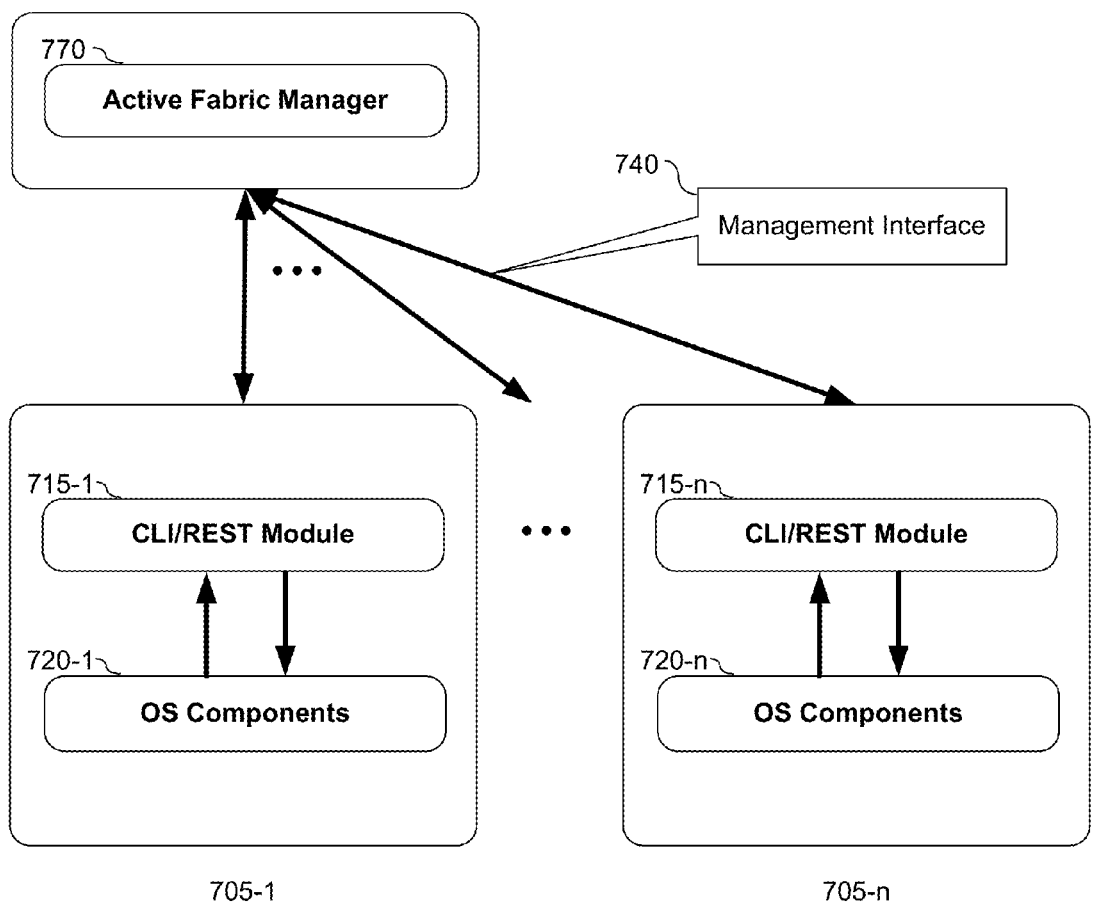
FIG. 7C depicts yet another alternative fabric management system according to embodiments of the present invention.

FIG. 7C depicts yet another alternative fabric management system according to embodiments of the present invention. It shall be noted that, in embodiments, existing products, such as (by way of example and not limitation) Active Fabric Manager supplied by Dell Force10 of San Jose, Calif. may be used with an N-Node VLT system as a configuration management server. In embodiments, the fabric manager 770 configures the node level parameters through the existing CLI module interface directly, and the fabric level parameters may be configured by CLI control plane.

5. CONTROL PLANE a. Fabric Manager

In embodiments, a fabric manager 510 implements control plane capability that works across all the nodes in an N-Node VLT system to realize and distribute the current topology among all the nodes. It shall be noted that, depending upon embodiment, each node's fabric manager acts independently and distributes and receives forwarding and link/VLT level information as needed. And, in such embodiments, when an explicit synchronization is required, a node acts as a primary. In embodiments, a fabric manager 510 of one node communicates with the fabric manager of other node using ICL links.

In embodiments, the ICL links provide full mesh (either physical or logical) connectivity. With the complete knowledge of the current topology, a fabric manager is able to ascertain the assigned nodes and port block masks for the nodes. In embodiments, apart from distributing the table entries to all the nodes, a fabric manager may also changes the owner of the table entries, when there is a topology change.

With hello messages, a fabric manager is able to recognize an ICL link failure and takes appropriate corrective action according to embodiments of the present invention. Upon recognizing node failure, the fabric manager makes appropriate updates to necessary nodes.

For L3 unicast and multicast support, in embodiments, a fabric manager or other control modules use ICL-VLAN or other spanning VLANs as a means to send the packet from one node to other node to complete L3 forwarding or replication.

Thus, in embodiments, the fabric manager may be responsible for the following areas:
  Building current ICL topology;
  Setup port block masks;
  Distributing L2/L3 unicast table updates;
  Distributing L2/L3 multicast table updates;
  Pre-compute updates for handling failure scenarios;
  Communicate with other nodes;
  Maintain ICL mesh;
  Table entry ownership and aging of entries;
  Identify ICL Failure and Node Failure;
  Electing topology-change-owner; and
  Load Balancing.

Figure 8:
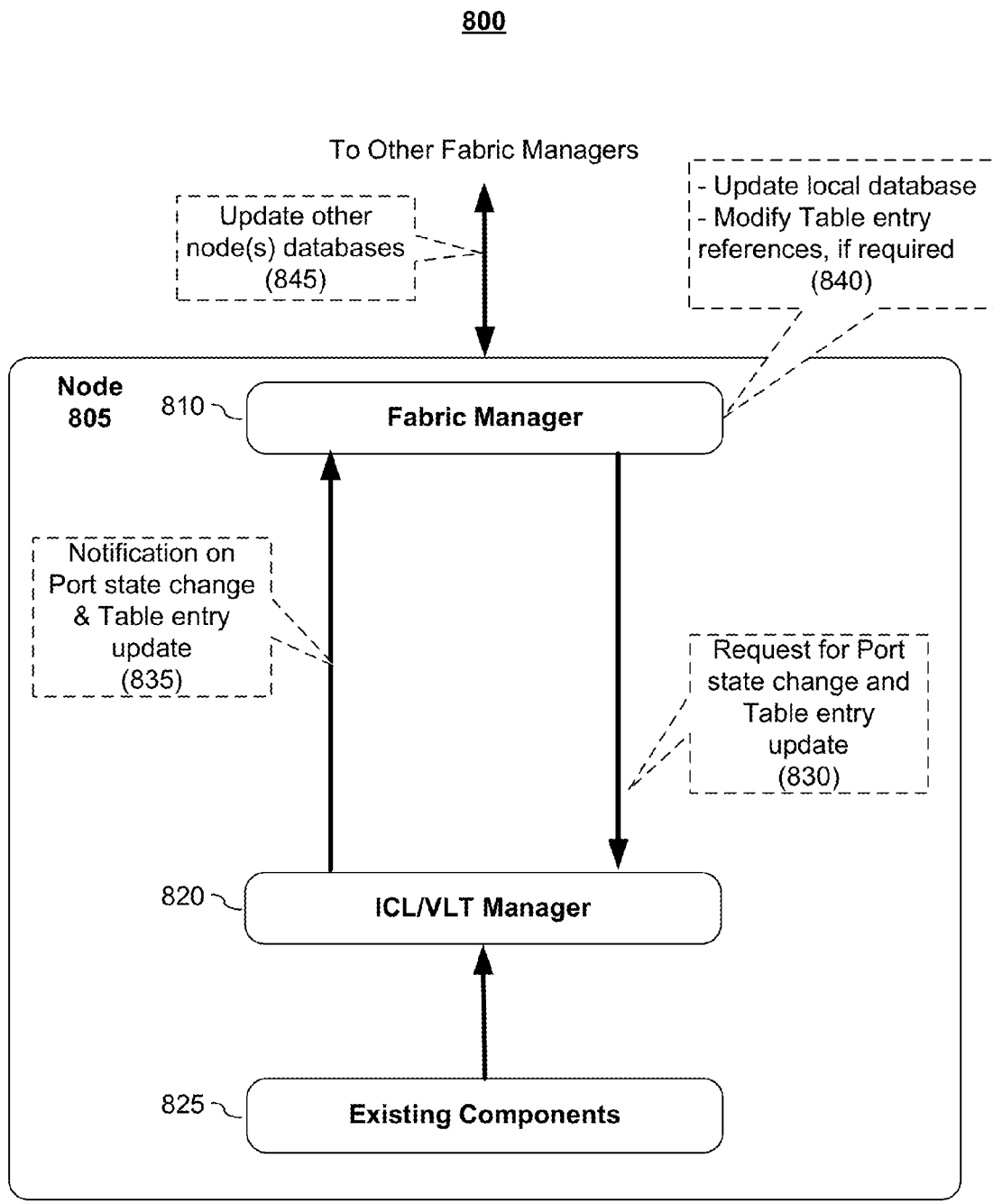
FIG. 8 depicts a general system and methodology of performing at least some of the above-listed items according to embodiments of the present invention.

It shall be noted that, in embodiments, the fabric manager may do more or fewer of the above-listed items. FIG. 8 depicts a general system and methodology of performing at least some of the above-listed items according to embodiments of the present invention.

Depicted in FIG. 8 is a fabric manager 810 communicatively coupled to an ICL/VLT manager 820 that is communicatively coupled with other networking components, which are collectively depicted as existing component 825. In embodiments, the fabric manager 810 makes one or more requests (830) of the ICL/VLT manager 820 to obtain changes and update information. For example, the ICL/VLT manager 820 interfaces with the other networking components (such as those depicted in FIG. 6) to obtain state changes and updates. In embodiments, this information is in turn provided (835) from the ICL/VLT manager 820 to the fabric manager 810 of the node 805. In embodiments, the fabric manager updates its local database(s) and modifies table entries, if necessary. The fabric manager, in embodiments, communicates this update information to other nodes in the N-Node VLT system, thereby providing a consistent configuration for all the nodes.

The functionalities performed by the fabric manager, according to embodiments, are provided in more detail below. To aid the explanation, consider (by way of example and not limitation) the topology depicted in FIG. 3. The topology of the N-Node VLT system in FIG. 3 may be represented by the following tables:

| VLT membership List | Assigned Node List | VLT-to-ICL Map |
|---|---|---|
| VLT1 {N1, N3, N4} | Assigned-Node {N2 – VLT1} => N1 | At N2: Map VLT1 to ICL(N1-N2) |
| VLT2 {N1, N2, N3, N4} | Assigned-Node {N1 – VLT3} => N2 | At N1: Map VLT3 to ICL(N1-N2) |
| VLT3 {N2} | Assigned-Node {N3 – VLT3} => N2 | At N3: Map VLT3 to ICL(N2-N3) |
| | Assigned-Node {N4 – VLT3} => N2 | At N4: Map VLT3 to ICL(N2-N4) |

| Initial Common Egress Mask | Specific Egress Mask |
|---|---|
| For all Nodes, | At N1: Ingress from ICL(N2-N1) allowed on VLT1 |
| Ingress from any ICL is denied on other ICLs | At N2: Ingress from ICL(N1-N2) allowed on VLT3 |
| Ingress from any ICL is denied on any VLT | At N2: Ingress from ICL(N3-N2) allowed on VLT3 |
| | At N2: Ingress from ICL(N4-N2) allowed on VLT3 | i. Building Current Topology

VLT Membership List

In embodiments, the fabric manager 810 receives notification (e.g., notification step 835) on port state change from its local ICL/VLT manager 820 as an ICL/VLT message. With this notification, it updates its node-specific VLT membership list and distributes (e.g., update 845) the node-specific VLT membership list with all other nodes through ICL/VLT message.

In embodiments, the fabric manager may also request VLT membership list(s) from other nodes by sending an ICL/VLT message with request for VLT membership list. The nodes respond to this request by sending their node-specific VLT membership lists. With these responses, the fabric manager builds a system-wide VLT membership list.

In embodiments, with node-specific VLT membership lists being received from all nodes, the fabric manager can update its system-wide VLT membership list.

ii. Building Current Topology

Assigned-Nodes List

In embodiments, the fabric manager identifies the assigned nodes for the list of VLTs for which it does not have VLT membership. This node-specific assigned node is again distributed to all other nodes as an ICL/VLT message.

In embodiments, with node-specific, assigned-node lists received from all nodes, the fabric manager can update its system-wide assigned-node list.

iii. Building Current Topology

Building Egress Mask and VLT-to-ICL Map

With system-wide VLT membership list and assigned-node list, a fabric manager may prepare a node egress mask and a VLT-to-ICL map.

In embodiment, the fabric manager prepares and maintains a node egress mask and a VLT-to-ICL map, and its responsibility may include distributing node-specific part(s) with other nodes.

In embodiments, in the above transactions, the nodes perform the topology realization alone. They install port block masks or table entry updates based on the realized topology.

iv. Setting Up Port Block Mask

In embodiments, from the egress mask, the fabric manager sends the ICL/VLT messages to install Port Block Mask updates for its assigned nodes.

In embodiments, as the next step, the fabric manager sends the ICL/VLT messages to install Port Block Mask updates to its local ICL/VLT manager.

In embodiments, the fabric manager also sends ICL/VLT messages with pre-computed Port Block Mask to other nodes to handle future failure scenarios.

In embodiments, the above order of ICL/VLT messages is preferably maintained to ensure that the assigned node is ready to forward packets from ICL to VLT, before the process of sending the packets to the assigned node through ICL link has started.

v. Distributing Unicast L2/L3 Table Updates

In embodiments, the fabric manager updates the local table entries, based on the MAC addresses learned and the protocol packets received. In addition to updating the local tables, the fabric manager may also ensure that table entries of other nodes are also updated appropriately by the table synchronization mechanism.

In embodiments, the fabric manager builds sync ICL/VLT messages with these table entries to update other nodes.

In embodiments, upon receiving these sync ICL/VLT messages, the fabric manager checks if VLT-to-ICL conversion is required based on its VLT membership.

In embodiments, if the node has VLT membership for the VLT referred by a sync ICL/VLT message, the sync ICL/VLT message is passed to the local ICL/VLT manager without any conversion.

However, in embodiments, if the node does not have VLT membership for the VLT referred by the sync ICL/VLT message, the fabric manager converts the VLT port references of sync ICL/VLT messages to ICL port using the system-wide VLT-to-ICL map and assigned-node list. The converted ICL/VLT sync message is sent to the local ICL/VLT manager for the table entry update.

vi. Distributing L2 Multicast Table Updates

In embodiments, the fabric manager updates the local L2 multicast table entries, based on the ports on which the Internet Group Management Protocol (IGMP) protocol packets is received. Apart from updating the local tables, in embodiments, the fabric manager may also ensure that table entries of other nodes are also updated appropriately by the table synchronization mechanism.

In embodiments, the fabric manager builds sync ICL/VLT messages with these table entries to update other nodes.

In embodiments, upon receiving these sync ICL/VLT messages, the fabric manager checks if VLT-to-ICL conversion is required based on its VLT membership. If the node has VLT membership for the VLT referred by sync ICL/VLT message, the sync ICL/VLT message may be passed to the local ICL/VLT Manager without any conversion. In embodiments, if the node does not have VLT membership for the VLT referred by sync ICL/VLT message, the fabric manager converts the VLT port references of sync ICL/VLT messages to ICL port, as explained in more detail in below, using the system-wide VLT-to-ICL map and assigned-node list. The converted ICL/VLT sync message is sent to the local ICL/VLT Manager for the table entry update.

vii. Distributing L3 Multicast Table Updates

In embodiments, while playing the role of first-hop router (FHR), the L3 multicast table is maintained by the node which joined the multicast group. Since the node that joined the multicast group alone executes the L3 multicast routing instance, other nodes are not updated by table synchronization mechanism.

While playing the role of last-hop router (LHR), the learned receiver ports are synchronized similar to the process discussed above with respect to the L2 multicast table updates.

viii. Pre-Compute Updates for Handling Failure Scenarios

In embodiments, the fabric manager prepares the actions to be performed for some or all failure conditions, including ICL link failures and Node failures. In embodiments, the planned actions normally include but are not limited to:

(1) One of the nodes should be moved out of the VLT system. The node to be moved out is identified.

(2) New assigned nodes are identified. The existing nodes should be assigned with new assigned nodes.

(3) The port block masks are prepared to achieve the above two points.

(4) With the new VLT-to-ICL map, the table entries are modified with new ICL port(s) to reflect this change.

In embodiments, if there is any topology change, these planned actions are modified and updated to related nodes again.

In embodiments, if a failed ICL link is fixed, those nodes that use that ICL link request VLT membership lists from other nodes by sending an ICL/VLT message with request for VLT membership list. The nodes respond to this request by sending their node-specific VLT membership list. With these responses, the fabric manager of these nodes builds a system-wide VLT membership list. In embodiments, the fabric managers compute the databases—VLT membership list, assigned-node list, and VLT-to-ICL map for the new topology. Based on the new assigned nodes identified, the fabric manager sends the new port block masks to corresponding nodes. The fabric manager applies its new VLT-to-ICL map on the existing table entries and sends them to the local ICL/VLT manager.

In embodiments, the introduction of a new node is handled by the fabric manager as follows. In embodiments, the fabric manager of the new node requests the list of active nodes from other nodes. This list helps the new node ensure that it has received responses from all the nodes to build the topology. In embodiments, the fabric manager of the new node requests VLT membership lists from other nodes as explained earlier and builds a system-wide VLT membership list. It may also compute the other tables/databases, namely VLT membership list, assigned-node list, and VLT-to-ICL map for the new topology. Based on the assigned nodes identified for the new node, the fabric manager sends the port block masks to corresponding nodes. In embodiments, the fabric manager of the new node may request table entries from one or more of the nodes. Once the new node receives the table entries, it first applies its VLT-to-ICL map on those received entries before sending them to the local ICL/VLT manager.

ix. Communicating with Other Nodes

In embodiments, the fabric manager (e.g., fabric manager 810 in FIG. 8) communicates with the ICL/VLT manager (e.g., ICL/VLT manager 820 in FIG. 8) of other nodes through the fabric manager of those nodes. A node's fabric manager uses ICL links to send the VLT message. In embodiments, the fabric manager may use, by way of example and not limitation, ICL protocol message format or other message formats to represent the above VLT messages. In embodiments, while sending VLT messages (for example, as ICL protocol messages, but other protocols may be used), the fabric manager may ensure that the protocol control packet gets prioritized.

x. Maintaining ICL Mesh

In embodiments, the ICL links between the nodes are in a full mesh configuration. In embodiments, to provide improved redundancy and bandwidth, each ICL link is a LAG on its own. Also, in embodiments, the fabric manager also ensures that all ICL ports are added to the membership of all VLANs of the VLT system.

xi. Table Entry Ownership and Aging of Entries

In embodiments, in the case of MAC table entries, the node which originally learned the MAC entry owns the entry and aging of the MAC entry is done by that node. In embodiments, similar to MAC table entry ownership, the node which locally resolved the Address Resolution Protocol (ARP) record owns the entry and aging of that ARP record. In embodiments, for each (Source (S), Group (G)) session, the node that actively receives the multicast traffic for that session assumes the ownership.

In embodiments, upon aging out of an entry, the owner of the table entry sends a delete VLT message to other nodes to remove the corresponding entry.

In embodiments, a node may lose its ownership for a specific table entry because of a VLT LAG failure, an ICL link failure, or a node failure. In such cases, the fabric manager of the node that has or assumes the topology-change-owner role sends a VLT message to a node to assume the ownership of the table entry, and the topology-change-owner node updates this ownership change to all other nodes. In embodiments, the topology-change-owner node may select a node to assume ownership of a table entry in any of a number of ways, including (but not limited to) selecting the node at random or selecting the node according to one or more criteria (such as, for example, selecting the node with the lowest MAC address).

xii. Identifying ICL Failure and Node Failure

In embodiments, the fabric managers send "Hello" messages to other fabric managers periodically. This mechanism helps to detect ICL link failures in finite time.

Fabric managers may also be configured to detect node failures. In embodiments, on each node, the failure of any ICL link triggers a normal "build current topology" process. Since the failed node would not participate in this topology building process, it would be isolated from the topology.

In embodiments, one of the fabric managers that detects a failure condition (ICL failure, node failure, or both) may assume the ownership of topology change handler and take appropriate action, which is discussed in more detail in the following section.

xiii. Electing Topology-Change-Owner

In embodiments, upon topology change, the current owners of the table entries might have lost their ownership. In such situations, the topology-change-owner node takes the responsibility of determining the table entries that require ownership change and sends ICL/VLT messages to those nodes to assume the ownership for that table entry.

In embodiments, upon topology change, the fabric manager of each node determines whether it needs to play the role of topology-change-owner based upon the following rules. Rule 1: if there is a LAG failure on Node Nx, then Node Nx should assume topology-change-owner role. Rule 2: if there is an ICL failure on ICL(Nx-Ny), and as per pre-computed actions, Node Ny is the node to be moved out of the VLT system, then Node Nx should assume the topology-change-owner role. Rule 3: if there is a node failure, then a node meeting one or more criteria (such as, for example, the node with the lowest MAC address) may assume topology-change-owner role. Rule 4: if there is a LAG recovery on Node Nx, then Node Nx may assume the topology-change-owner role. Rule 5: if there is a node inclusion, then the node meeting one or more criteria (such as, for example, the node with the lowest MAC address among the existing nodes) may assume the topology-change-owner role. And, Rule 6: the identification of the topology-change-owner for recovery of an ICL may be similar to the node inclusion scenario.

xiv. Load Balancing

In embodiments, while identifying node-specific assigned nodes, the fabric manager may try to use as many nodes as assigned nodes to load balance the traffic with following guidelines. As a guideline, a fabric manager should attempt to minimize the amount of VLT traffic redirected to a specific assigned node. Also as a guideline, a fabric manager should attempt to maximize the number of nodes used as assigned nodes. One skilled in the art shall recognize other methodologies and guidelines that may be employed to assist in load balancing.

b. ICL/VLT Manager

Figure 9:
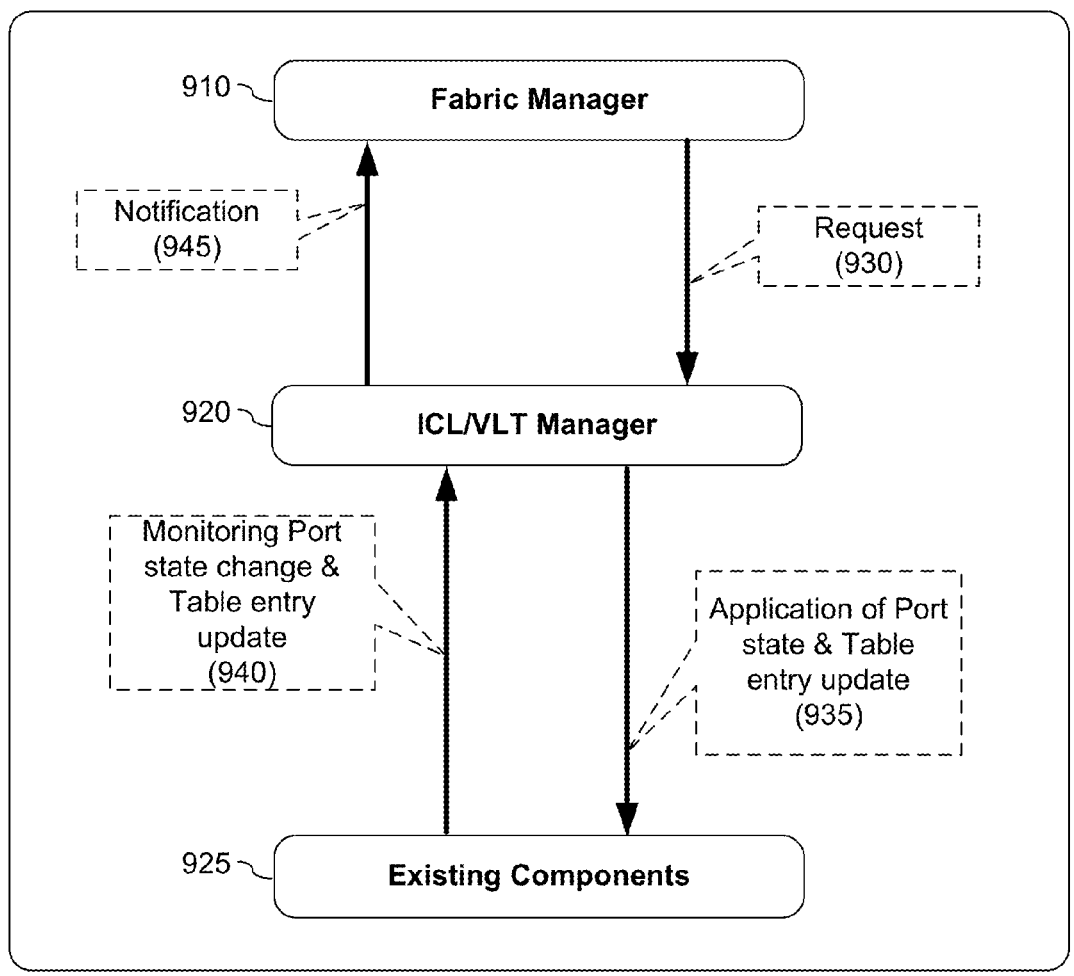
FIG. 9 depicts a general system and at least some of the functionality performed by an ICL/VLT manager according to embodiments of the present invention.

In embodiments, an ICL/VLT manager enables a fabric manager to realize the topology of the network and take appropriate steps. For example, in embodiments, the responsibilities/functionalities of an ICL/VLT manager may include one or more of the following:

Monitor the local port state change and table entry update
Send notification to Fabric Managers
Perform one or more actions requested by Fabric Managers
Handle failure conditions with pre-computed actions
More detailed information about the responsibilities/functionalities of an ICL/VLT manager is provided below.

i. Monitor the Local Port State Change & Table Entry Update and Send Notifications to the Fabric Manager of all Nodes In embodiments, the ICL/VLT manager monitors for port state changes and table entry modifications. FIG. 9 depicts a general system and at least some of the functionality performed by an ICL/VLT manager according to embodiments of the present invention.

Depicted in FIG. 9 is a fabric manager 910 communicatively coupled to an ICL/VLT manager 920 that is communicatively coupled with other networking components, which are collectively depicted as existing component 925. In embodiments, the fabric manager 910 makes one or more requests (930) of the ICL/VLT manager 920. The ICL/VLT manager 920 interfaces (935) with the other networking components (such as those depicted in FIG. 6) to obtain port state changes and table entry updates. In embodiments, this information is provided (940) to the ICL/VLT manager 920, which is in turn provided (945) as a notification or notifications to the fabric manager 910. In embodiments, the ICL/VLT manager sends the notification messages to the fabric managers of all nodes for port status change and table entry modifications. And, in embodiments, these notifications are also received by the local fabric manager.

ii. Perform the Action Requested by Fabric Managers of Other Nodes

In embodiments, an ICL/VLT manager configures the local ports based upon the port-state-change request message(s) received from fabric managers of other nodes via its fabric manager. In embodiments, an ICL/VLT manager also modifies the local tables based upon the table-entry-change request message(s) received from other nodes via its fabric manager. Also, in embodiments, an ICL/VLT manager notifies its local fabric manager as needed to maintain state.

iii. Failure Handling

In embodiments, an ICL/VLT manager maintains one or more pre-computed updates and planned actions from fabric managers for ICL link failure and node failure. Information regarding embodiments of pre-computed updates was provided regarding pre-computed updates for handling failure scenarios in the fabric manager section (above). In embodiments, upon recognizing an ICL link failure or a node failure, an ICL/VLT manager performs the required planned actions by applying those pre-computed updates.

iv. Message Format

In embodiments, an ICL/VLT manager communicates with the fabric manager of other nodes through ICL links (through Fabric Manager of other nodes). In embodiments, an ICL/VLT manager may use ICL protocol message format to represent the messages mentioned above. However, one skilled in the art shall recognize that other message formats may be used.

6. FORWARDING PLANE

Programming Tables

Embodiments of the N-Node VLT system include data plane/forwarding plane systems and methodologies for n-way multipathing. Presented below are embodiments for handling traffic flows.

a. Assigned Node Impact on Table and Egress Port Masks

In embodiments, any traffic coming on an ICL is, in general, blocked on all VLT ports of that node. However, this behavior may be modified in the case of assigned node. Consider, by way of example and not limitation, the following assigned-node assignment:

Assigned-Node (N2–VLT1)=>N1

The above assignment implies that VLT1 does not have a port on Node N2; and hence, for traffic ingressing on Node N2, it will use Node N1 to egress the packet to VLT1.

In embodiments, the above assignment will result in the following programming:

(1) On Node N1, packets ingressing on the ICL(N2-N1) will be allowed to egress on VLT1; and (2) On Node N2, for MACs learned on VLT1, the egress port will be marked as ICL(N1-N2).

b. Port Block Mask Programming

To prevent duplicate packets being received on the VLT and also to prevent loops, the following port blocks may be installed.

In embodiments, on a node Nx, a general rule for port block masks are: (1) traffic ingressing on any ICL link is normally blocked on all other ICLs; and (2) traffic ingressing on ICL (Nx-Ny) on node Ny is allowed on a specific VLTx, if for that VLTx, node Ny is the assigned node for VLTx on node Nx. In embodiments, this block may be dynamic and change based on: (a) VLT membership on the nodes (i.e., links coming up or going down), and (b) changes in the assigned node for that VLTx on any node.

In embodiments, the port block mask for assigned nodes (like Ny) are programmed first. Port block mask for VLT-absent nodes (like Nx) may be programmed next, and other nodes may be programmed last.

In embodiments, all broadcast, unknown unicast, and unknown multicast packets are flooded on the ICL by the ingress node to reach all other nodes.

c. MAC Table Programming

In embodiments, the MAC information learned on a VLTx on any node Nx may be programmed on all nodes according to the following rules:

(1) If the VLTx has a member on node Nx, then the MAC will be programmed as learned on that VLTx.

(2) If the VLTx has no member on node Nz, and Ny is the assigned node for VLTx on Node Nz, then the MAC will be programmed as learned on the ICL towards node Ny (i.e., ICL(Nz-Ny)). Since node Nz relies on node Ny, the MAC table update for Ny may be done before updating Nz.

(3) Essentially, if the VLT has an active member on this node, the node provide a local exit; else, the traffic ingressing on this node is directed to node Ny for that VLT.

In embodiments, learning is disabled on all ICL ports.

d. Layer 2 Multicast Programming

In embodiments, Internet Group Management Protocol (IGMP) control packets for a multicast group MGi from VLTx received on any node Nx may be processed on all nodes per the rules below.

i. For IGMP Query Packets (1) If the VLTx has a member on node Nx, the VLTx may be learned as MRouter-VLT for the multicast group MGi.

(2) If the VLTx has no member on node Nz, and Ny is the assigned node for VLTx on node Nz, then the ICL(Nz-Ny) may be learned as MRouter-VLT for the multicast group MGi. Since Node Nz relies on Node Ny, membership update for Ny may be done before updating Nz.

(3) In embodiments, only the node Nx processes the IGMP query packet and floods it to all VLTs similar to broadcast packets. The port block mask prevents duplicate IGMP query packets reaching all VLTs.

ii. For IGMP Join Report/Leave Packets (1) If the VLTx has a member on node Nx, the VLTx may be learned as multicast group member-VLT for the multicast group MGi.

(2) If the VLTx has no member on node Nz, and Ny is the assigned node for VLTx on node Nz, then the ICL(Nz-Ny)

may be learned as multicast group member-VLT for the multicast group MGi. Since Node Nz relies on the Node Ny, membership update for Ny may be done before updating Nz.

(3) In case of a Join report packet, the multicast group member-VLT may be added to the destination ports for multicast group MGi. In case of a Leave packet, the multicast group member-VLT may be removed from the destination ports for multicast group MGi.

(4) In embodiments, the node Nx checks if the Join report/Leave packet should be flooded to MRouter-VLTs. Based on whether it should be flooded, the node Nx floods packets to MRouter-VLTs.

e. Address Resolution Protocol (ARP) Entry Programming

In embodiments, if ARP is resolved for an IP address of an L3 VLAN interface VLANx, where VLTx is a member of that VLAN on any node Nx, then the ARP entry will be programmed on all nodes per the rules below:

(1) The ARP response packet may be processed as mentioned below, only if the destination MAC of the ARP response is one of the my-station addresses of the VLT nodes.

(2) If VLTx has a member on node Nx, then the ARP entry may be programmed as resolved on that VLTx.

(3) If VLTx has no member on node Nz, and Ny is the assigned node for VLTx on Node Nz, then the ARP entry may be programmed, as resolved on ICL(Nz-Ny). Since Node Nz relies on the ARP entry on Node Ny, ARP entry update for Ny may be done before updating Nz.

(4) Equal-cost multi-path routing (ECMP) option may be considered in Layer 3 packet handling.

f. Layer3 Multicast Programming

In embodiments, if one of the VLT nodes acts as the designated router, then one or more of the other VLT nodes may act as backup designated router.

i. Node Nx as Source-side Designated Router (DR)/First Hop Router (FHR)

1. For L3 Multicast Data Packet

In embodiments, the multicast data packet for a multicast group MGi from VLTx received on any node Nx may be processed on all nodes per the rules below:

(1) If the node Nx is the designated router (DR)/first hop router (FHR):

(a) In the case of unknown multicast packets, it sends unicast source registration packets to Rendezvous Point (RP).

(b) In the case of known multicast packets, it replicates the packets to the interfaces specified by the outgoing interface (oif) list of group MGi.

(2) If the node Nx is not the DR, it floods the multicast packet on the ICL and other L2 interfaces.

2. Processing PIM Stop Register Packets

In embodiments, upon receiving a Protocol Independent Multicast (PIM) stop register packet for a multicast group MGi from a Layer 3 virtual link trunk VLTx, the node Nx, being a designated router, will process the packet.

3. Processing PIM (S, G) Join Packets

In embodiments, upon receiving a PIM join packet for a multicast group MGi from a Layer 3 virtual link trunk VLTx, the node Nx, being a first hop router, will add VLTx to the (S,G) outgoing interface (oif) list of group MGi.

4. Processing PIM (S, G) Prune Packets

In embodiments, upon receiving a PIM prune packet for a multicast group MGi from a Layer 3 virtual link trunk VLTx, the node Nx, being a first hop router, will remove VLTx from the (S,G) outgoing interface (oif) list of group MGi.

ii. Node Nx as Receive-Side DR/Last Hop Router (LHR)

1. For IGMP Join/Membership Report Packet

In embodiments, upon receiving an IGMP join/membership report packet for a multicast group MGi from VLTx, the node Nx adds VLTx to the outgoing interface (oif) list of group MGi. Based on the processing, the node Nx may send PIM join to the incoming interface (iif) VLTs, if required.

2. For IGMP Leave Packet

In embodiments, upon receiving an IGMP leave packet for a multicast group MGi from VLTx, the node Nx removes VLTx from the outgoing interface (oif) list of group MGi. Based on the processing, the node Nx may send PIM prune to incoming interface (iif) VLTs, if required. In embodiments, the node Nx may also check if any interested receivers are present by sending an IGMP Query to all MGi members.

3. For Layer 3 Multicast Data Packet

In embodiments, Layer 3 multicast data packets for a multicast group MGi from Layer 3 virtual link trunk VLTx received on any node Nx may be replicated to the interfaces specified by the outgoing interface (oif) list for group MGi.

7. EXAMPLE PACKET WALK-THROUGHS

Figure 10:
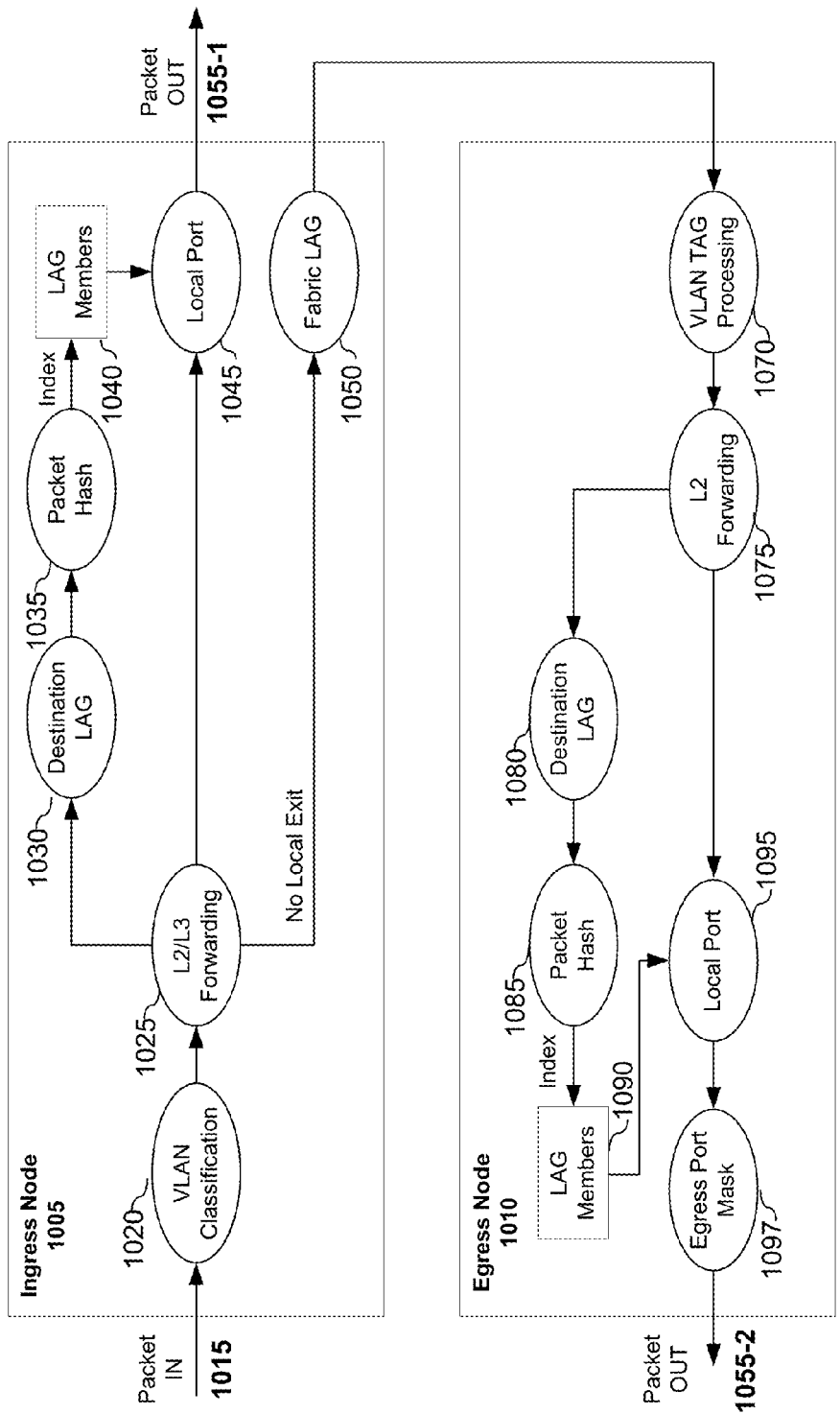
FIG. 10 depicts a Layer 2/Layer 3 unicast packet walk-through according to embodiments of the present invention.
Figure 11:
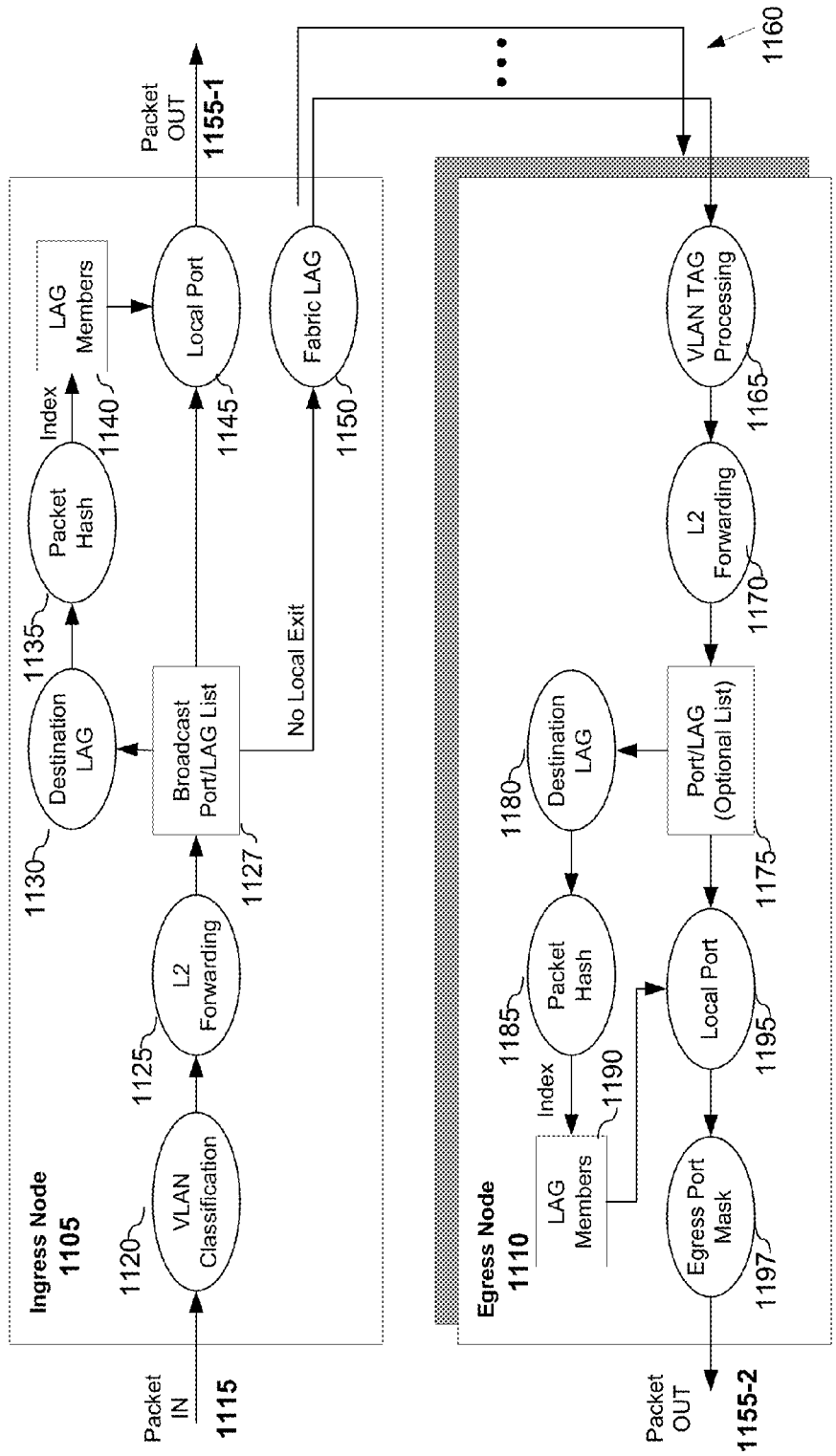
FIG. 11 depicts Layer 2 broadcast packet walk-through according to embodiments of the present invention.
Figure 12:
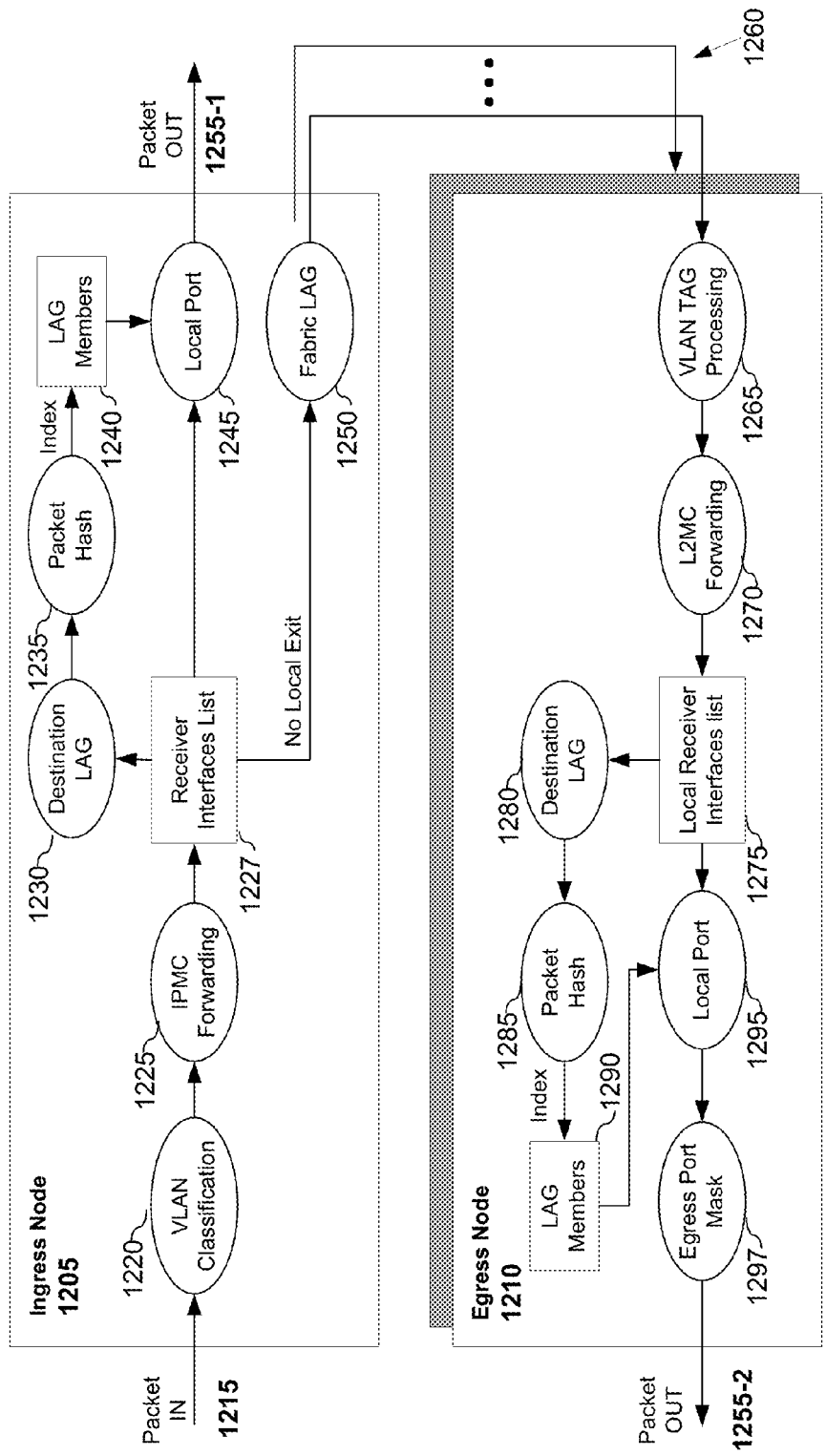
FIG. 12 depicts IP multicast packet flows according to embodiments of the present invention.

FIGS. 10-12 depicts some packet walk-throughs for various situations according to embodiments of the present invention. These examples are provided by way of illustration only and not limitation.

a. Layer 2/Layer 3 Unicast Packet Walk-Through

FIG. 10 depicts a Layer 2/Layer 3 unicast packet walk-through according to embodiments of the present invention. As shown in FIG. 10, an incoming unicast packet 1015 received at an ingress node 1005 that is part of an N-Node VLT system. The ingress node will determine the incoming VLAN 1020 for the unicast packet. The L2/L3 forwarding 1025 will identify forwarding designation for the packet based upon IP or MAC table information. Depending upon the designation, one of three options may occur: (1) local exit; (2) LAG local exit; or (3) transmit via an ICL link to a node that has a link to the designation.

Path (1)—Local Exit: A unicast packet 1015 ingressing on a node 1005 of the VLT N-Node system that has a designation that has a link on the ingress node 1005 will egress through that local port link 1045 on the ingress node 1005.

Path (2)—LAG Local Exit: If the unicast packet has a designation that has multiple links of a LAG that terminate on the ingress node 1005, the packet traffic may be distributed or otherwise load balanced (e.g., via packet hash 1035) and is transmitted via one or more of the local links 1045.

Path (3)—Transmission via ICL to another Node: If the ingress node 1005 does not have a link to the designation for the packet, the ingress node selects a node in the N-Node VLT system that does. If multiple nodes in the system participate in the designation, then the ingress node may select one of the nodes to receive the traffic. In embodiments, the ingress node sends the data to the assigned node for this data traffic.

In embodiments, the packet traffic arriving at the egress node on the ICL link is processed 1070 to identify the egress VLAN tag. The L2 forwarding 1075 uses the MAC address look-up to identify the designation. Path (3) comprises two possible pathways depending upon the packet's designation—those pathways are similar to the Path (1) and Path (2), above. For example, if the unicast packet traffic is intended for a node that has multiple links of a VLT/LAG on the egress node, the packet traffic may be distributed or otherwise load balanced (e.g., via packet hash 1085) and is transmitted via the local port 1090 of a VLT LAG link 1095. If the unicast packet traffic is intended for a single link on the egress node, the packet is transmitted via that local port 1095 on the egress node.

b. Layer 2 Broadcast Packet Walk-Through

FIG. 11 depicts Layer 2 broadcast packet walk-through according to embodiments of the present invention. The incoming packet 1115 is received at the ingress node 1105, and the VLAN is identified 1120. Since this is a Layer 2 broadcast, the packet broadcast will stay within the incoming VLAN. The forwarding table 1125 indicates which ports or LAGs on which the packet should be broadcast. Similar to the prior scenarios of FIG. 10, the packets will be sent to local ports and/or peer nodes depending upon the system configuration. Thus, if there are links that are present on the ingress node that are part of the VLAN (i.e., local ports), the packet is broadcast to them. If there are members of the VLAN that are not on the ingress node, the packet is sent on the ICL link(s) to these assigned nodes. It shall be noted that the packet may be sent on multiple ICL links 1160. It should be noted that the packet flow of FIG. 11 may also include an egress port mask 1197 to stop loops.

c. IP Multicast Packet Walk-Through

FIG. 12 depicts IP multicast packet flows according to embodiments of the present invention. One skilled in the art shall recognize that IP multicast packet flows are generally the same to those depicted above with respect to FIG. 11 with the exception that some of the processing involves some Layer 3 elements. For example, part of the packet processes involve looking at other tables, such as IP addresses, receiver interfaces 1227, and local receiver interfaces 1275, the so forth.

8. PACKET FLOWS EXAMPLES

FIGS. 13-19 depicts some packet flows for various situations according to embodiments of the present invention.

a. Broadcast and Unknown Unicast Packet Flow

Example 1

Figure 13:
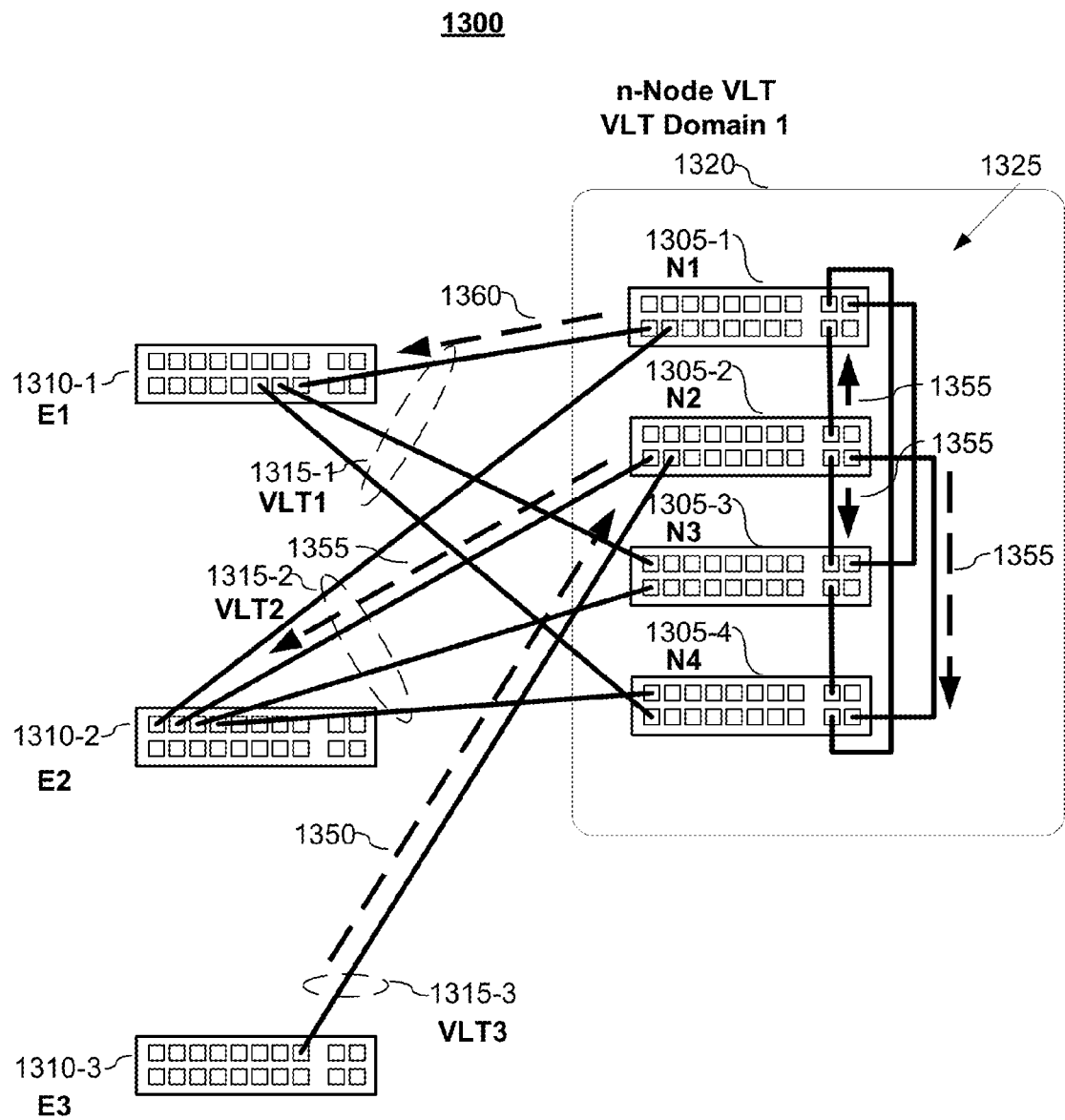
FIG. 13 depicts an example embodiment of an N-Node VLT system 1300 according to embodiments of the present invention.

FIG. 13 depicts an example embodiment of an N-Node VLT system 1300 according to embodiments of the present invention. Depicted in FIG. 13 are four nodes N1 (1305-1), N2 (1305-2), N3 (1305-3), and N4 (1305-4), which form a 4-node VLT system 1320.

In forming the VLT system, the nodes are connected via a plurality of links 1325. These links may be referred to, interchangeably, as inter-node links (INLs), inter-chassis links (ICLs), or Virtual Link Trunk Interfaces (VLTIs). As shown in the embodiment depicted in FIG. 13, the nodes (N1-N4) are connected in a full mesh. While the depicted embodiment is a physical full mesh, it shall be noted that the nodes may be in a logical full mesh.

Also depicted in FIG. 13 are a number of VLT LAGs. External node E1 1310-1 has three links, which terminate on nodes N1, N3, and N4. These three links together form a VLT LAG, namely VLT1 1315-1. External node E2 1310-2 has four links that together form VLT2 1315-2. These links terminate on nodes N1, N2, N3, and N4. Finally, external node E3 1310-3 has one link, which terminate on node N2. This link forms VLT3 1315-3. Thus, the VLT memberships may be summarized as follows:

VLT1 {N1, N3, N4}
VLT2 {N1, N2, N3, N4}
VLT3 {N2}

The assigned nodes for the N-Node VLT system 1300 in FIG. 13 may be as follows:

Assigned-Node {N2–VLT1}=>N1
Assigned-Node {N1–VLT3}=>N2
Assigned-Node {N3–VLT3}=>N2
Assigned-Node {N4–VLT3}=>N2

In embodiments, the egress mask may be generated for each of the nodes in FIG. 13. The following table summarizes the system-wide egress mask:

| N1 | | N2 | | N3 | | N4 | |
|---|---|---|---|---|---|---|---|
| Ingress | Egress Mask | Ingress | Egress Mask | Ingress | Egress Mask | Ingress | Egress Mask |
| ICL(N2-N1) | Allow VLT1 | ICL(N1-N2) | Deny VLT1 | ICL(N1-N3) | Deny VLT1 | ICL(N1-N4) | Deny VLT1 |
|  | Deny VLT2 |  | Deny VLT2 |  | Deny VLT2 |  | Deny VLT2 |
|  | Deny VLT3 |  | Allow VLT3 |  | Deny VLT3 |  | Deny VLT3 |
| ICL(N3-N1) | Deny VLT1 | ICL(N3-N2) | Deny VLT1 | ICL(N2-N3) | Deny VLT1 | ICL(N2-N4) | Deny VLT1 |
|  | Deny VLT2 |  | Deny VLT2 |  | Deny VLT2 |  | Deny VLT2 |
|  | Deny VLT3 |  | Allow VLT3 |  | Deny VLT3 |  | Deny VLT3 |
| ICL(N4-N1) | Deny VLT1 | ICL(N4-N2) | Deny VLT1 | ICL(N4-N3) | Deny VLT1 | ICL(N3-N4) | Deny VLT1 |
|  | Deny VLT2 |  | Deny VLT2 |  | Deny VLT2 |  | Deny VLT2 |
|  | Deny VLT3 |  | Allow VLT3 |  | Deny VLT3 |  | Deny VLT3 |

In embodiments, using the system 1300 depicted in FIG. 13 as an example, the handling of broadcast/unknown unicast packets may be processed as follows. First, external node E3 (1310-3) sends (1350) a broadcast packet to node N2 (1305-2). Node N2 (1305-2) floods (1355) the broadcast packets to all its local ports including all its ICL ports. The nodes N1, N3, and N4 flood (1360) the packets to their local ports based on their port blocks. Note that traffic ingressing on ICL(N2-N1) on node N1 is allowed on VLT1, as node N1 is the assigned node for VLT1 on node N2, but the data is blocked at node N3 and node N4.

b. Broadcast and Unknown Unicast Packet Flow

Example 2

Figure 14:
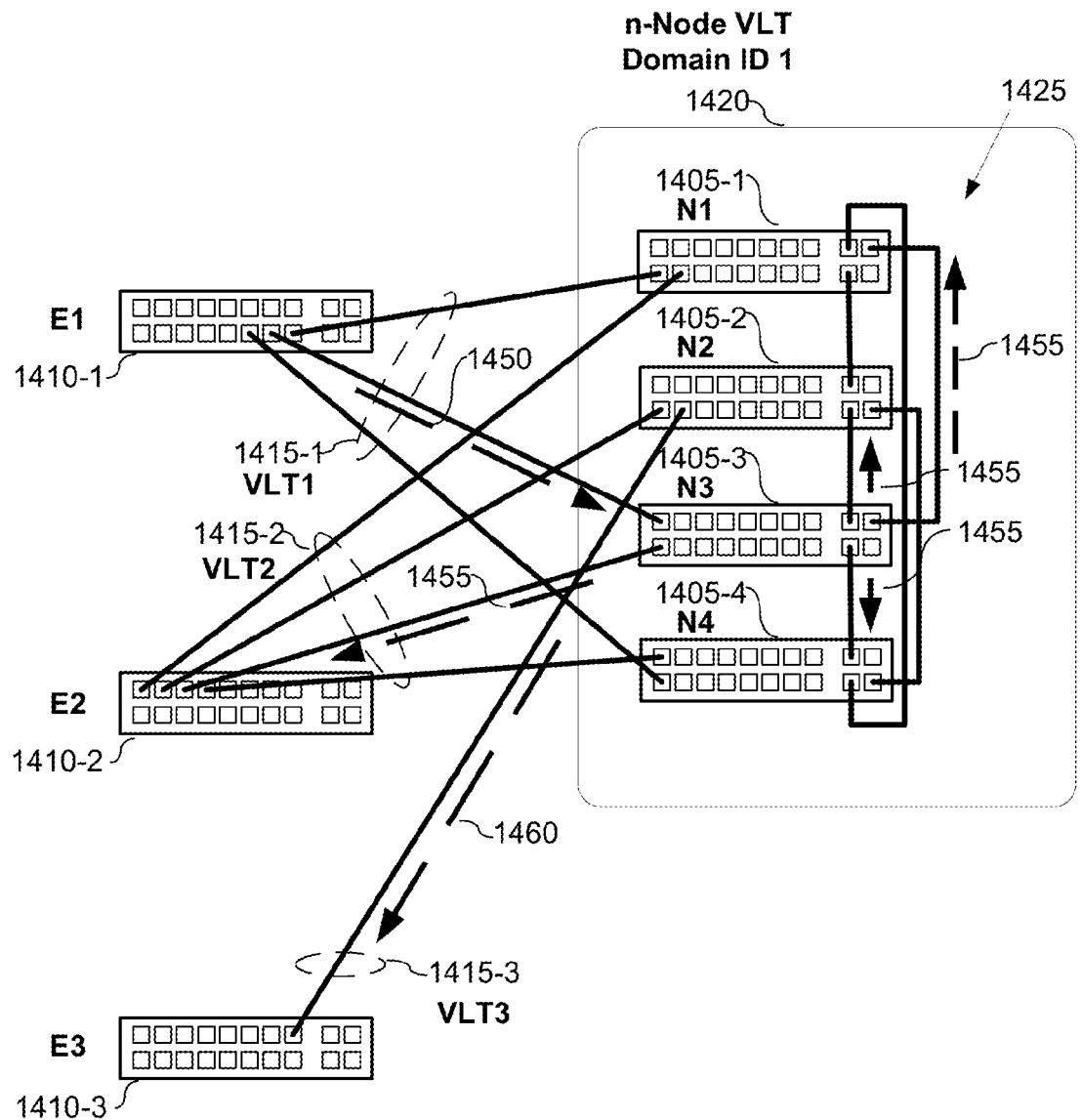
FIG. 14 depicts an example embodiment of an N-Node VLT system 1400 according to embodiments of the present invention.

FIG. 14 depicts an example embodiment of an N-Node VLT system 1400 according to embodiments of the present invention. The system depicted in FIG. 14 has four nodes N1 (1405-1), N2 (1405-2), N3 (1405-3), and N4 (1405-4), which form a 4-node VLT system 1420. The embodiment depicted in FIG. 14 is the same configuration as in FIG. 13. Thus, it has the same VLT memberships, the same assigned nodes, and the same egress mask.

In embodiments, using the system 1400 depicted in FIG. 14 as an example, the handling of broadcast/unknown unicast packets may be processed as follows. First, external node E1 (1410-1) sends (1450) a broadcast packet to node N3 (1405-3). Node N3 (1405-3) floods (1455) the broadcast packets to all its local ports including all its ICL ports. The nodes N1, N2, and N4 flood (1460) the packets to their local ports based on their port blocks. Note that traffic ingressing on ICL(N3-N2) on node N2 is allowed to exit/egress on VLT3, as node N2 is the assigned node for VLT3 on node N3, but the traffic is blocked for nodes N1 and N4.

c. Layer 2 Unicast Packet Flow

Figure 15:
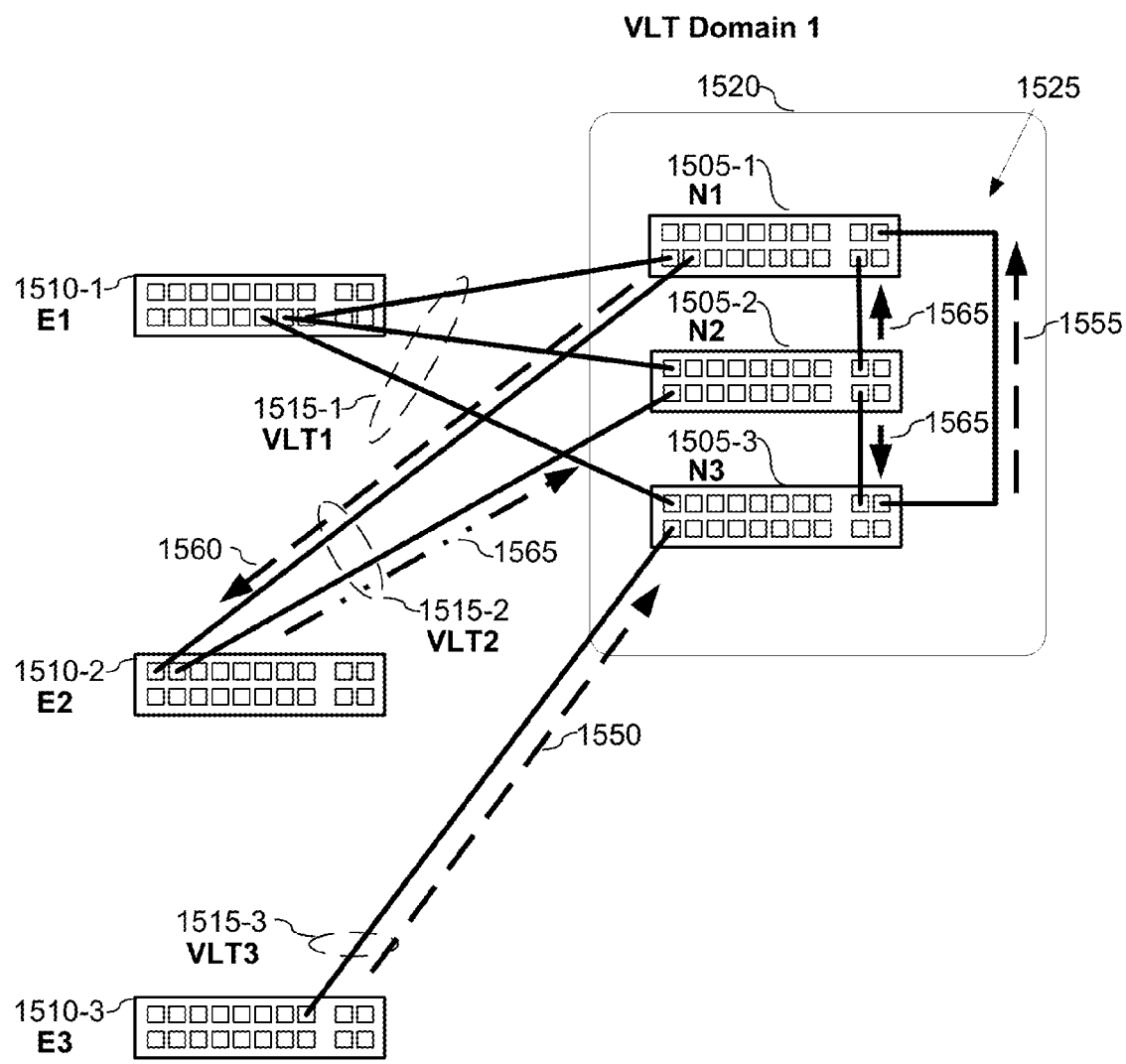
FIG. 15 depicts an example embodiment of an N-Node VLT system 1500 according to embodiments of the present invention.

FIG. 15 depicts an example embodiment of an N-Node VLT system 1500 according to embodiments of the present invention. Depicted in FIG. 15 are three nodes N1 (1505-1), N2 (1505-2), and N3 (1505-3), which form a 3-node VLT system 1520.

In forming the VLT system, the nodes are connected via a plurality of links 1525. As shown in the embodiment depicted in FIG. 15, the nodes (N1-N3) are connected in a full mesh. While the depicted embodiment is a physical full mesh, it shall be noted that the nodes may be in a logical full mesh.

External node E1 1510-1 has three links, which terminate on nodes N1, N2, and N3. These three links together form VLT1 1515-1. External node E2 1510-2 has two links that together form VLT2 1515-2. These links terminate on nodes N1 and N2. Finally, external node E3 1510-3 has one link, which terminate on node N3, and forms VLT3 1515-3. The VLT memberships may be summarized as follows:
 VLT1 {N1, N2, N3}
 VLT2 {N1, N2}
 VLT3 {N3}

The assigned nodes for the N-Node VLT system 1500 in FIG. 15 may be as follows:
 Assigned-Node {N3–VLT2}=>N1
 Assigned-Node {N1–VLT3}=>N3
 Assigned-Node {N2–VLT3}=>N3

In embodiments, assume for the purposes of this example that the following MAC addresses for each VLT are: MAC M1 at VLT1; MAC M2 at VLT2; and MAC M3 at VLT3.

The following table summarizes the MAC table:

| N1 | | N2 | | N3 | |
|---|---|---|---|---|---|
| DST MAC | Egress Port | DST MAC | Egress Port | DST MAC | Egress Port |
| M1 | VLT1 | M1 | VLT1 | M1 | VLT1 |
| M2 | VLT2 | M2 | VLT2 | M2 | ICL(N1-N3) |
| M3 | ICL(N1-N3) | M3 | ICL(N2-N3) | M3 | VLT3 |

In embodiments, using the system 1500 depicted in FIG. 15 as an example, the handling of Layer 2 unicast packets may be processed as follows. First, external node E3 (1510-3) sends (1550) a Layer 2 unicast packet destined to M2 at VLT2 through node N3 (1505-3). Node N3 (1505-3) sends (1555) the unicast packet to its assigned node, Node N1, via the ICL. At Node N1, the packet reaches (1560) M2 by local exit. Note that, in embodiments, the MAC entry may be sent (1565) as a VLT message to all the other nodes.

d. Layer 2 Multicast Packet Flow

Figure 16:
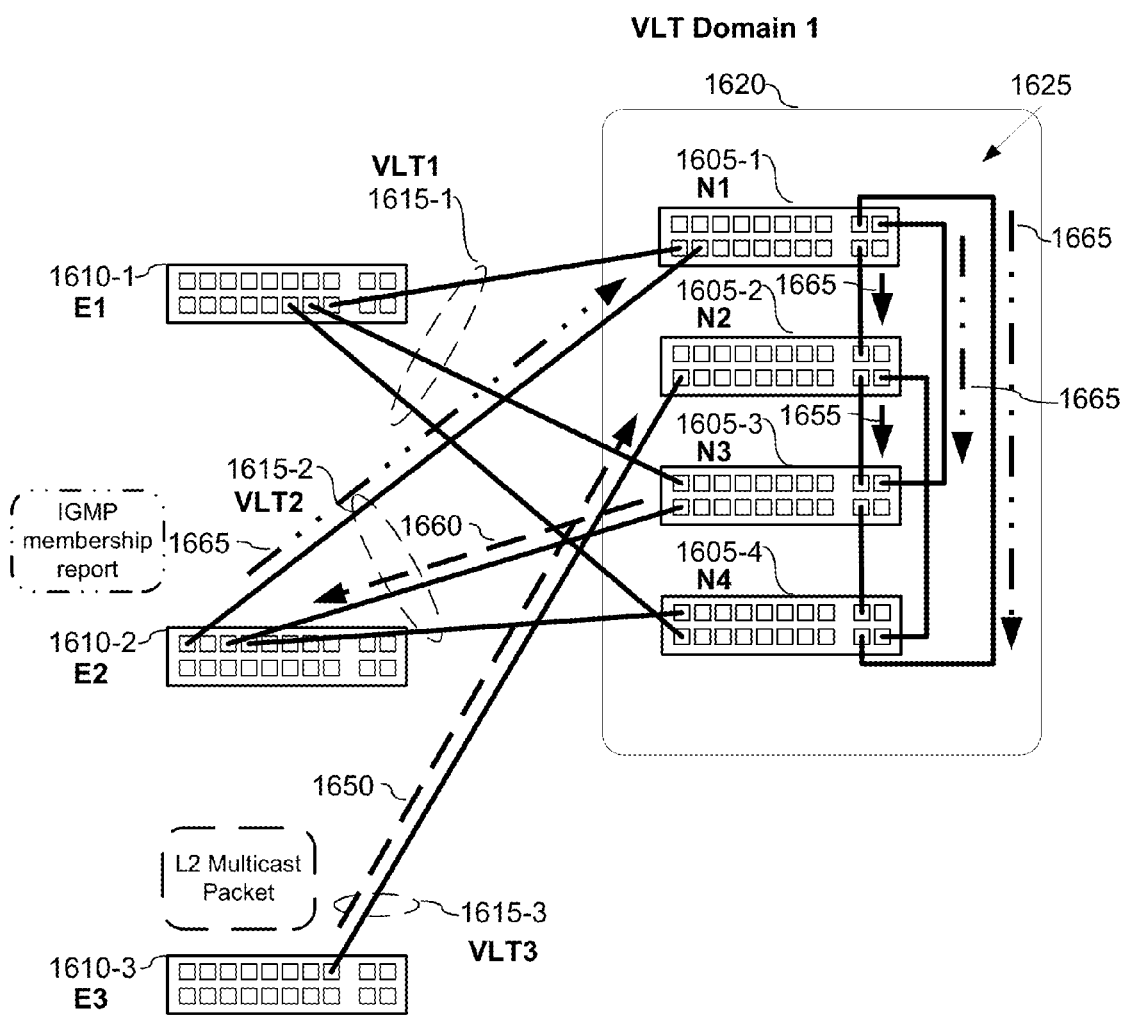
FIG. 16 depicts an example embodiment of an N-Node VLT system 1600 according to embodiments of the present invention.

FIG. 16 depicts an example embodiment of an N-Node VLT system 1600 according to embodiments of the present invention. Depicted in FIG. 16 are four nodes N1 (1605-1), N2 (1605-2), N3 (1605-3), and N4 (1605-4), which form a 4-node VLT system 1620. In forming the VLT system, the nodes are connected via a plurality of ICL links 1625. As shown in the embodiment depicted in FIG. 16, the nodes (N1-N4) are connected in a full (physical or logical) mesh.

External node E1 1610-1 has three links, which terminate on nodes N1, N3, and N4. These three links together form VLT1 1615-1. External node E2 1610-2 has three links that together form VLT2 1615-2. These links terminate on nodes N1, N3, and N4. Finally, external node E3 1610-3 has one link, which terminate on node N2 and forms VLT3 1615-3. The VLT memberships may be summarized as follows:
 VLT1 {N1, N3, N4}
 VLT2 {N1, N3, N4}
 VLT3 {N2}

The assigned nodes for the N-Node VLT system 1600 in FIG. 16 may be as follows:
 Assigned-Node {N2–VLT1}=>N1
 Assigned-Node {N2–VLT2}=>N3
 Assigned-Node {N1–VLT3}=>N2
 Assigned-Node {N3–VLT3}=>N2
 Assigned-Node {N4–VLT3}=>N2

In embodiments, assume for the purposes of this example that, for the multicast group MG1, VLT1 is the receiving member and VLT3 is the MRouter member. Also assume that VLT2 is the receiving member of multicast Group MG2.

The following is the Multicast Table for each node:

| N1 | | N2 | | N3 | | N4 | |
|---|---|---|---|---|---|---|---|
| Multicast Group | Egress Ports | Multicast Group | Egress Ports | Multicast Group | Egress Ports | Multicast Group | Egress Ports |
| MG1 | VLT1 ICL(N1-N2) | MG1 | ICL(N2-N1) VLT3 | MG1 | VLT1 ICL(N3-N2) | MG1 | VLT1 ICL(N4-N2) |
| MG2 | VLT2 | MG2 | ICL(N2-N3) | MG2 | VLT2 | MG2 | VLT2 |

In embodiments, using the system 1600 depicted in FIG. 16 as an example, the handling of Layer 2 multicast packets may be processed as follows. First, external node E3 (1610-3) sends (1650) a Layer 2 multicast packet destined to MG2 through node N2 (1605-2). Node N2 (1605-2) sends (1655) the multicast packet to its assigned node, Node N3. At Node N3, the packet reaches (1660) MG2 by local exit. Note that, in embodiments, the IGMP membership report may be sent (1665) as a VLT message to all the other nodes.

e. Layer 3 Unicast Packet Flow

Figure 17:
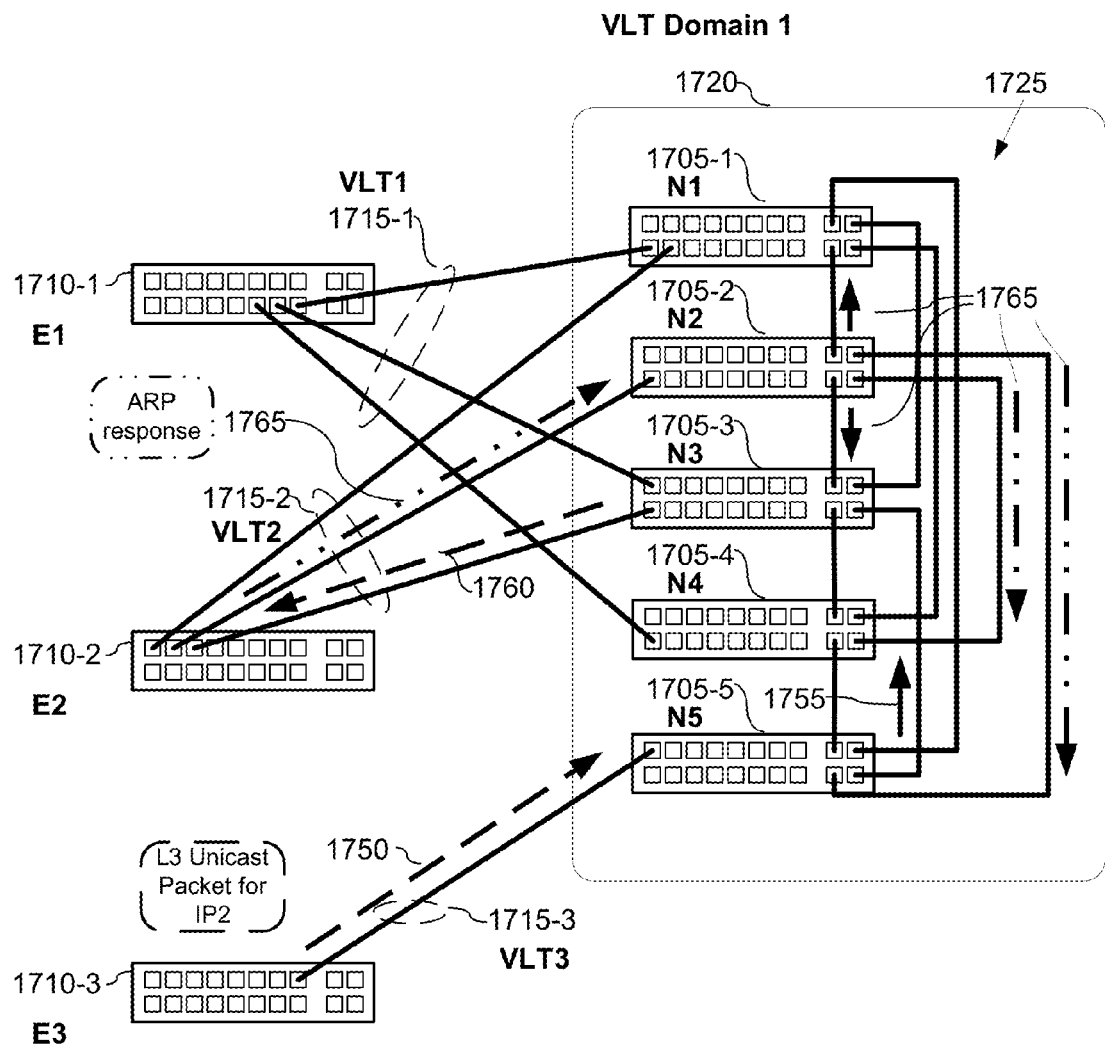
FIG. 17 depicts an example embodiment of an N-Node VLT system 1700 according to embodiments of the present invention.

FIG. 17 depicts an example embodiment of an N-Node VLT system 1700 according to embodiments of the present invention. Depicted in FIG. 17 are five nodes N1 (1705-1), N2 (1705-2), N3 (1705-3), N4 (1705-4), and N5 (1705-5), which form a 5-node VLT system 1720. In forming the VLT system, the nodes are connected via a plurality of ICL links 1725. As shown in the embodiment depicted in FIG. 17, the nodes (N1-N5) are connected in a full (physical or logical) mesh.

External node E1 1710-1 has three links, which terminate on nodes N1, N3, and N4. These three links together form VLT1 1715-1. External node E2 1710-2 has three links that together form VLT2 1715-2. These links terminate on nodes N1, N2, and N3. Finally, external node E3 1710-3 has one link, which terminate on node N5 and forms VLT3 1715-3. The VLT memberships may be summarized as follows:

VLT1 {N1, N3, N4}
VLT2 {N1, N2, N3}
VLT3 {N5}

The assigned nodes for the N-Node VLT system 1700 in FIG. 17 may be as follows:

Assigned-Node {N2-VLT1}=>N1
Assigned-Node {N5-VLT1}=>N1
Assigned-Node {N4-VLT2}=>N3
Assigned-Node {N5-VLT2}=>N3
Assigned-Node {N1-VLT3}=>N5
Assigned-Node {N2-VLT3}=>N5
Assigned-Node {N3-VLT3}=>N5
Assigned-Node {N4-VLT3}=>N5

In embodiments, assume for the purposes of this example that VLT1 and VLT3 are members of VLAN1; VLT2 is a member of VLAN2; and that IP1, IP2, and IP3 are the IP addresses at E1, E2, and E3. Also, the following is the L3 Table for each node:

f. Layer 3 Multicast Packet Flow

First Hop Router

Figure 18:
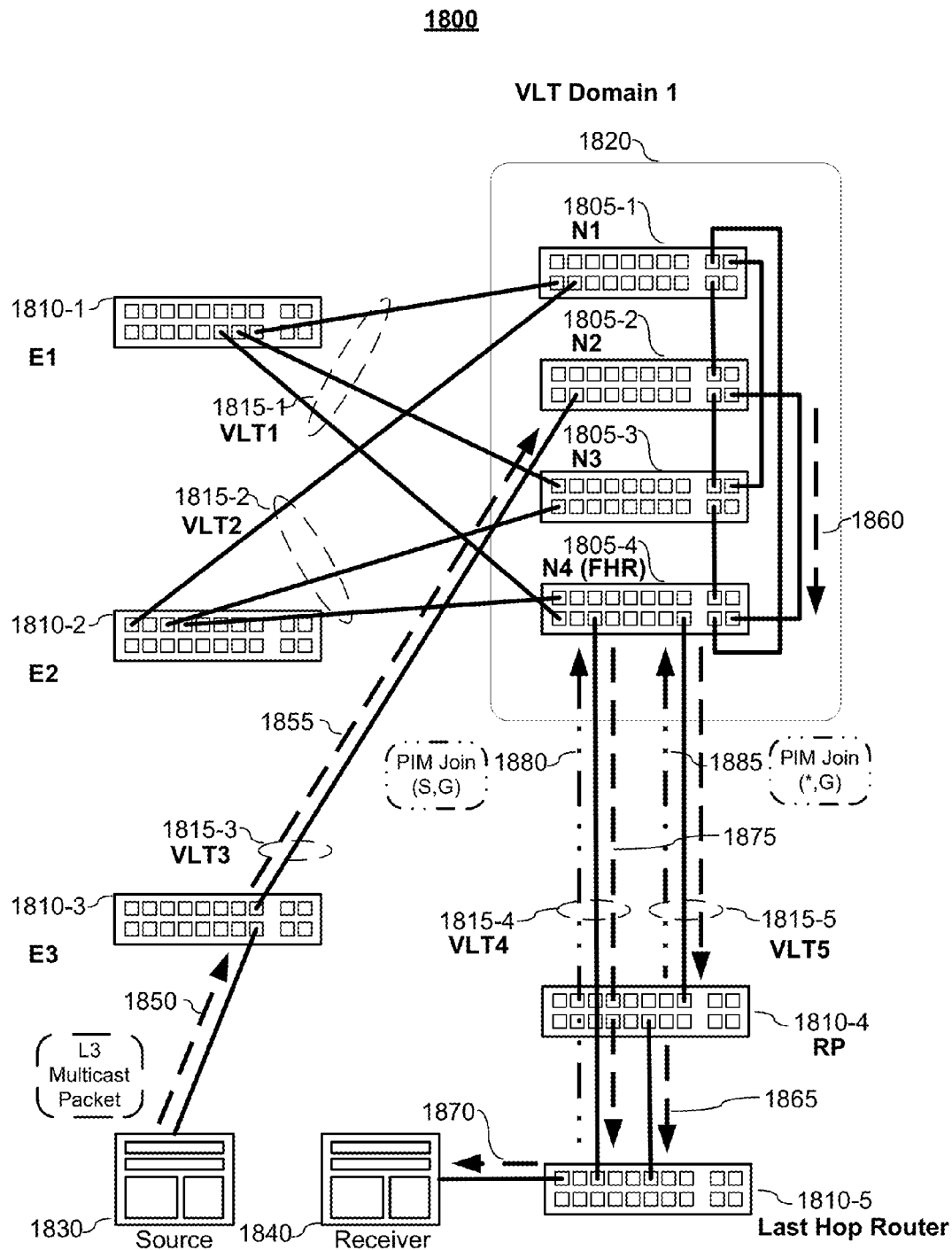
FIG. 18 depicts an example embodiment of an N-Node VLT system 1800 according to embodiments of the present invention.

FIG. 18 depicts an example embodiment of an N-Node VLT system 1800 according to embodiments of the present invention. Depicted in FIG. 18 are four nodes N1 (1805-1), N2 (1805-2), N3 (1805-3), and N4 (1805-4), which form a 4-node VLT system 1820. In forming the VLT system, the nodes are connected via a plurality of ICL links. As shown in the embodiment depicted in FIG. 18, the nodes (N1-N4) are connected in a full (physical or logical) mesh.

External node E1 1810-1 has three links, which terminate on nodes N1, N3, and N4. These three links together form VLT1 1815-1. External node E2 1810-2 has three links that together form VLT2 1815-2. These links terminate on nodes N1, N3, and N4. External node E3 1810-3 has one link, which terminate on node N2 and forms VLT3 1815-3. Also depicted in FIG. 18 is a rendezvous point (RP) device 1810-4 that connects to node N4, which acts a first hop router (FHR) for multicast group MG3. Finally, FIG. 18 also includes a last hop router 1810-5 that connects to the RP and to Node 4.

The VLT memberships may be summarized as follows:
VLT1 {N1, N3, N4}
VLT2 {N1, N3, N4}
VLT3 {N2}

The assigned nodes for the N-Node VLT system 1800 in FIG. 18 may be as follows:

Assigned-Node {N2-VLT1}=>N1
Assigned-Node {N2-VLT2}=>N3
Assigned-Node {N1-VLT3}=>N2
Assigned-Node {N3-VLT3}=>N2
Assigned-Node {N4-VLT3}=>N2

Assume for the purposes of this example that Node N4 is the first hop router for MG3; that VLT4 and VLT5 are Layer 3 VLTs (Layer 3 interfaces). Also, assume that at Node N4, for MG3: VLT5 is the outgoing interface (OIF) list member before shortest path tree (SPT) switchover; and VLT4 is the outgoing interface (OIF) list member after SPT switchover.

Using the system 1800 depicted in FIG. 18 as an example, the handling of Layer 3 multicast packet flow may be processed as follows.

Before SPT Switchover:

In embodiments, the source 1830 sends (1850, 1855) a Layer 3 multicast packet to the FHR 1805-4 destined to MG3. Node N2 1805-2 floods (1860) the packet to Node N4 (FHR) through the ICL. Node N4 replicates (1865) the packet to RP,

| N1 | | N2 | | N3 | | N4 | | N5 | |
|---|---|---|---|---|---|---|---|---|---|
| DST IP | Egress Port | DST IP | Egress Port | DST IP | Egress Port | DST IP | Egress Port | DST IP | Egress Port |
| IP1 | VLT1 | IP1 | ICL(N2-N1) | IP1 | VLT1 | IP1 | VLT1 | IP1 | ICL(N5-N1) |
| IP2 | VLT2 | IP2 | VLT2 | IP2 | VLT2 | IP2 | ICL(N4-N3) | IP2 | ICL(N5-N3) |
| IP3 | ICL(N1-N5) | IP3 | ICL(N2-N5) | IP3 | ICL(N3-N5) | IP3 | ICL(N4-N5) | IP3 | VLT3 |

In embodiments, using the system 1700 depicted in FIG. 17 as an example, the handling of Layer 3 unicast packets may be processed as follows. First, external node E3 (1710-3) sends (1750) a Layer 3 unicast packet destined to IP address IP2. Node N5 (1705-75) sends (1755) the packet to its assigned node, Node N3. At Node N3, the packet reaches (1760) IP address IP2 by local exit. Note that, in embodiments, the ARP response/ARP entry may be sent (1765) as a VLT message to all the other nodes.

which replicates (1865) the packet to the LHR 1810-5. Finally, the LHR replicates 1870 the packet to the receiver 1840.

After SPT Switchover:

In embodiments, the source 1830 sends (1850, 1855) a Layer 3 multicast packet to the FHR 1805-4 destined to MG3. Node N2 1805-2 floods (1860) the packet to Node N4 (FHR) through the ICL. Node N4 replicates (1875) the packet to the LHR 1810-5. Finally, the LHR replicates 1870 the packet to the receiver 1840. In embodiments, a Protocol Independent Multicast (PIM) Join (S,G) message (1880) and a PIM Join (*,G) message 1885 is sent to node N4 (FHR) 1805-4.

g. Layer 3 Multicast Packet Flow

Last Hop Router

Figure 19:
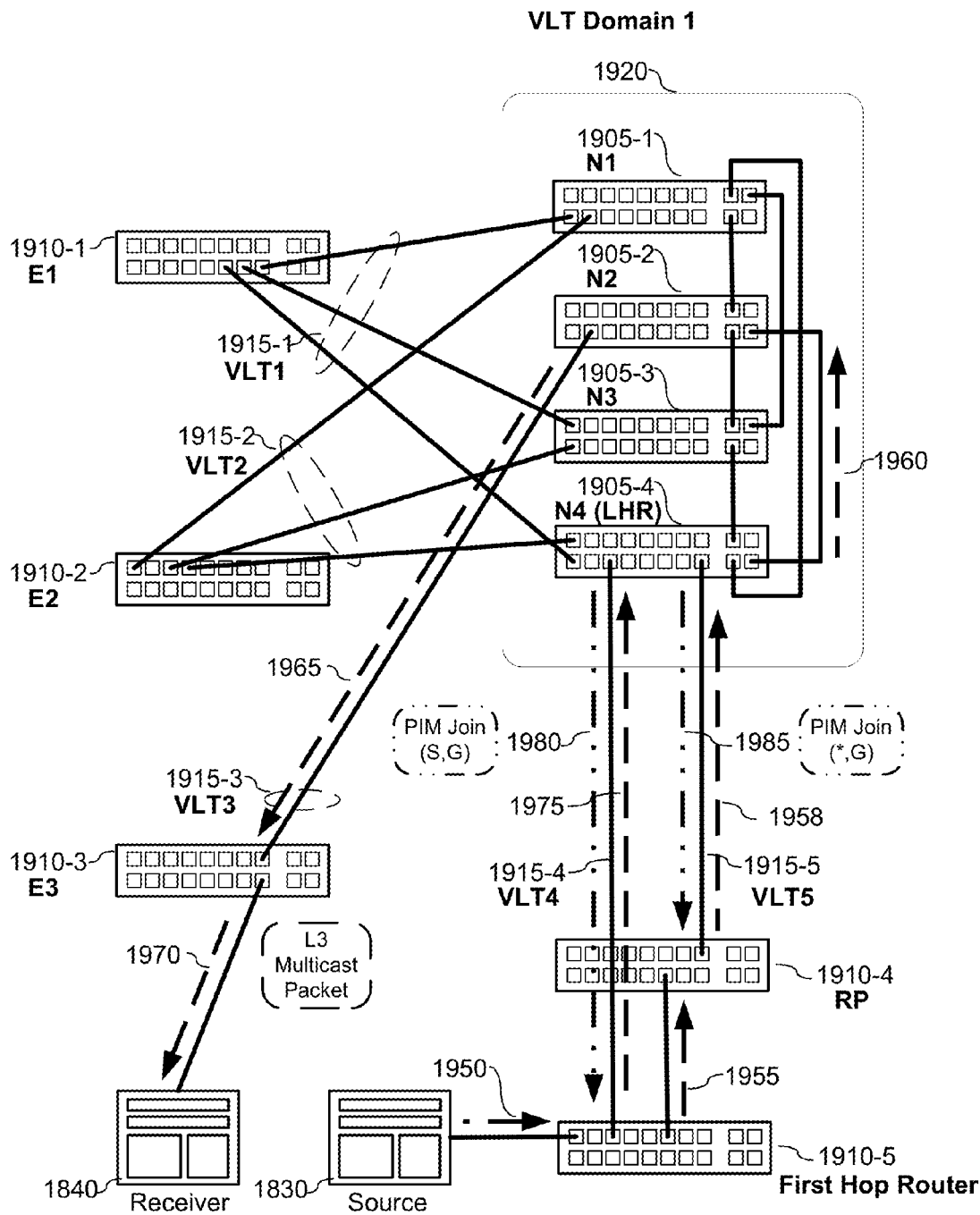
FIG. 19 depicts an example embodiment of an N-Node VLT system 1900 according to embodiments of the present invention.

FIG. 19 depicts an example embodiment of an N-Node VLT system 1900 according to embodiments of the present invention. Depicted in FIG. 19 are four nodes N1 (1905-1), N2 (1905-2), N3 (1905-3), and N4 (1905-4), which form a 4-node VLT system 1920. In forming the VLT system, the nodes are connected via a plurality of ICL links. As shown in the embodiment depicted in FIG. 19, the nodes (N1-N4) are connected in a full (physical or logical) mesh.

External node E1 1910-1 has three links, which terminate on nodes N1, N3, and N4. These three links together form VLT1 1915-1. External node E2 1910-2 has three links that together form VLT2 1915-2. These links terminate on nodes N1, N3, and N4. External node E3 1910-3 has one link, which terminate on node N2 and forms VLT3 1915-3. Also depicted in FIG. 19 is a rendezvous point (RP) device 1910-4 that connects to node N4, which acts a last hop router (LHR) for the multicast group MG3. Finally, FIG. 19 also includes a first hop router 1910-5 that connects to the RP and to Node 4.

The VLT memberships may be summarized as follows:

VLT1 {N1, N3, N4}
VLT2 {N1, N3, N4}
VLT3 {N2}

The assigned nodes for the N-Node VLT system 1900 in FIG. 19 may be as follows:

Assigned-Node {N2–VLT1}=>N1
Assigned-Node {N2–VLT2}=>N3
Assigned-Node {N1–VLT3}=>N2
Assigned-Node {N3–VLT3}=>N2
Assigned-Node {N4–VLT3}=>N2

Assume for the purposes of this example that Node N4 is the last hop router for MG3; that VLT4 and VLT5 are Layer 3 VLTs (Layer 3 interfaces). Also, assume that at Node N4, for MG3: VLT5 is the incoming interface (IIF) list member before shortest path tree (SPT) switchover; and VLT4 is the incoming interface (IIF) list member after SPT switchover.

Using the system 1900 depicted in FIG. 19 as an example, the handling of Layer 3 multicast packet flow may be processed as follows.

Before SPT Switchover:

In embodiments, the source 1930 sends (1950) a Layer 3 multicast packet to the FHR 1910-5 destined to MG3. The FHR sends (1955) the packet to the RP 1910-4. The RP sends (1958) the packet to Node 4, which acts as the LHR. Node N4 1905-4 floods (1960) the packet to Node N2 through the ICL. At Node N2, the packet reaches (1965, 1970) MG3 by local exit.

After SPT Switchover:

In embodiments, the source 1930 sends (1950) a Layer 3 multicast packet to the FHR 1910-5 destined to MG3. The FHR sends (1975) the packet to Node N4 (LHR) through the ICL. At Node N2, the packet reaches (1965, 1970) MG3 via local exit.

In embodiments, a Protocol Independent Multicast (PIM) Join (S,G) message (1980) is communicated to the FHR and a PIM Join (*,G) message 1885 is communicated to the RP.

9. FAILURE SCENARIOS

Aspects of the N-Node VLT system include handling various failure scenarios. By way of illustration, presented below are embodiments for handling: (1) VLT LAG failure; (2) ICL failure; and (3) Node failure.

a. Handling VLT LAG Failure

Table Programming for VLT LAG Failure

FIG. 20 depicts a method for handling a VLT LAG in an N-Node VLT system according to embodiments of the present invention. In embodiments, when a VLT LAG is broken on node Nx, the node Nx becomes (2005) the topology-change-owner and performs table entry ownership change or changes. Node Nx computes (2010) the assigned node for the failed VLT LAG and installs the necessary port block masks. When the broken VLT LAG is restored, the port block masks installed to handle the VLT LAG failure may be (2015) reverted back to their pre-failure states. In embodiments, to avoid potential loops again, the existing port blocks are opened only after the new blocks are installed first. Here, node Nx would be the topology-change-owner; it assumes the topology-change-owner role and performs table entry ownership change(s).

b. Handling ICL Failure

Table Programming for ICL Failure

FIG. 21 depicts a method for handling ICL link failure in an N-Node VLT system according to embodiments of the present invention. In embodiments, when an ICL link ICL (Nx-Ny) is broken, one of the node (e.g., node Nx) is chosen to be moved out of the N-Node VLT system based on certain criteria which is discussed below but some examples include the ability to maintain full (physical/logical) mesh between nodes and/or the ability to have maximum number of VLTs available after the change. In embodiments, the VLT and ICL ports of the node Nx are programmed according to the following rules:

(1) The VLT ports are disabled (2105) at Nx and Ny according to the following rules: (a) if VLTx has Nx as its only member, VLTx is retained at node Nx; and (b) if VLTy has more members including Nx, then VLTx is disabled at node Nx.

(2) All of the ICL ports, except one, are disabled (2110) at Nx. The criterion or criteria to choose the ICL to be retained is discussed below. It shall be noted that, in embodiments, no ICL ports need to be disabled—they may all be active. In so doing, it can be beneficial to continue to communicate and establish full mesh when the "down" ICL link comes back up.

(3) The node (e.g., Nx) is then moved out (2115) of the VLT system. The port block mask and table programming will ensure that it will behave like a normal switch connected to one of the VLT node.

(4) Since the topology has changed, the assigned nodes are recomputed (2120).

(5) To avoid potential loops, while changing the assigned nodes, the existing port blocks are opened (2125) only after the new blocks are installed first.

(6) The node that is retained in the VLT system is the topology-change-owner. That node changes (2130) the ownership of the affected table entries to an existing node that meets a selected criterion or criteria (e.g., the node that has the lowest MAC address).

(7) When the broken link is restored, the node Nx will be included (2135) in N-Node VLT system again. Since the topology has changed again, the assigned nodes are computed again. To avoid potential loops again, the existing port blocks are opened only after the new blocks are installed first. Here, the node that satisfies a criterion or criteria (e.g., the node with lowest MAC address among the existing nodes) becomes the topology-change-owner.

c. Handling Node Failure

Table Programming for Node Failure

FIG. 22 depicts a method for handling node failure in an N-Node VLT system according to embodiments of the present invention. In embodiments, when a Node Nx has failed, it may be moved out of the N-Node VLT system and the following steps taken. Since the topology has changed, the assigned nodes are recomputed (2205) by all the nodes. When the node failure is detected, the node meeting a criterion or criteria (e.g., the node with the lowest MAC address) becomes the topology-change-owner, and it changes (2210) the ownership of the affected table entries to the node that has the lowest MAC address. To avoid potential loops, while changing the assigned nodes, the existing port blocks may be opened (2215) only after the new blocks are installed first.

When the failed node is brought up, it is again included in the N-Node VLT system. Since the topology has changed again, the assigned nodes are recomputed (2220) again. To avoid potential loops, the existing port blocks are opened only after the new blocks are installed first. Here, the node that satisfies a criterion or criteria (e.g., the node with lowest MAC address among the existing nodes) becomes the topology-change-owner.

10. ADVANTAGES

It shall be noted that embodiments of an N-Node VLT system provide several advantages over prior solutions. Presented below are some of the advantages provided by N-Node systems. One skilled in the art shall recognize other benefits.

a. Large L2 Domain

An N-Node VLT system allows for a single large L2 domain with multiple switches at a single layer (access, distribution, or core), that operate and appear logically as a single switch. While providing greater flexibility of a single switch, it addresses common scaling issues present in large L2 domain.

b. Virtual Chassis

An N-Node VLT system behaves like a virtual chassis wherein it allows dynamic introduction of additional nodes to address improved resiliency and bandwidth requirements. Also, unlike a regular chassis, the traffic through the fabric links is greatly reduced in N-Node VLT systems as most of the traffic is expected to use local-exit to reach the destination.

c. Flexibility

Connect to any Number of Nodes

With N-Node VLT system, each switch may be connected to a maximum of N nodes within the VLT-Domain. This feature allows networking operations vastly greater flexibility in expanding their networks. No longer must systems be expanded in set units of only one or two nodes. Rather, any number of nodes may be added. Furthermore, in prior system a domain could only have a limited number of nodes, with an N-Node VLT system any number of nodes is possible. And, when joining the nodes, one need not connect all the nodes together with ICL links as the fabric will be able to route to the nodes.

d. Scalability

With support for multiple nodes within a VLT-domain, the scalability is increased manifold in terms of number of ports and number of VLTs.

e. Bandwidth

With multi-point LAG local exit on VLT members, an N-Node VLT system provides improved bandwidth for east-west traffic. Unlike typical chassis systems that drive much of the traffic to a backplane, N-Node VLT systems are designed to allow for much of the traffic to have a local exit. Thus, the bandwidth for east-west traffic is proportional to the number of nodes in the N-Node VLT system.

f. Improved Resiliency

The failure of a node in an N-Node VLT system impacts the available bandwidth much less than the 50% of current 2-node systems. In an N-Node VLT system, the failure of a node only impacts the overall system by at most 1/N. Therefore, the availability can be further improved by increasing the number of nodes in the VLT system.

g. L3 Capability

Another key benefit that separates N-Node VLT systems from existing approaches is its support for Layer 3 (L3). By supporting existing L3 protocols, an N-Node VLT system adds scalability and resiliency to those L3 protocols.

h. Multi-Fabric Control Plane

Because the N-Node VLT system operates using a multi-fabric control plane of loosely coupled nodes, it provides better resiliency. Also, multiple control planes distributed across the nodes provides better scalability as compared to single brain approaches.

i. Single-Fabric Management

Because the N-Node VLT is designed with a single management entity, managing the cluster of devices is simplified like managing a single device.

j. Collapsed Heterogeneous Core

With the introduction of N-Node VLT feature for a wide range of new and existing switch products, it is possible to build a VLT domain with heterogeneous switches. The switches negotiate their capabilities when they build the VLT system.

11. INFORMATION HANDLING SYSTEM EMBODIMENTS

It shall be noted that the present patent document is directed to information handling systems. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 23:
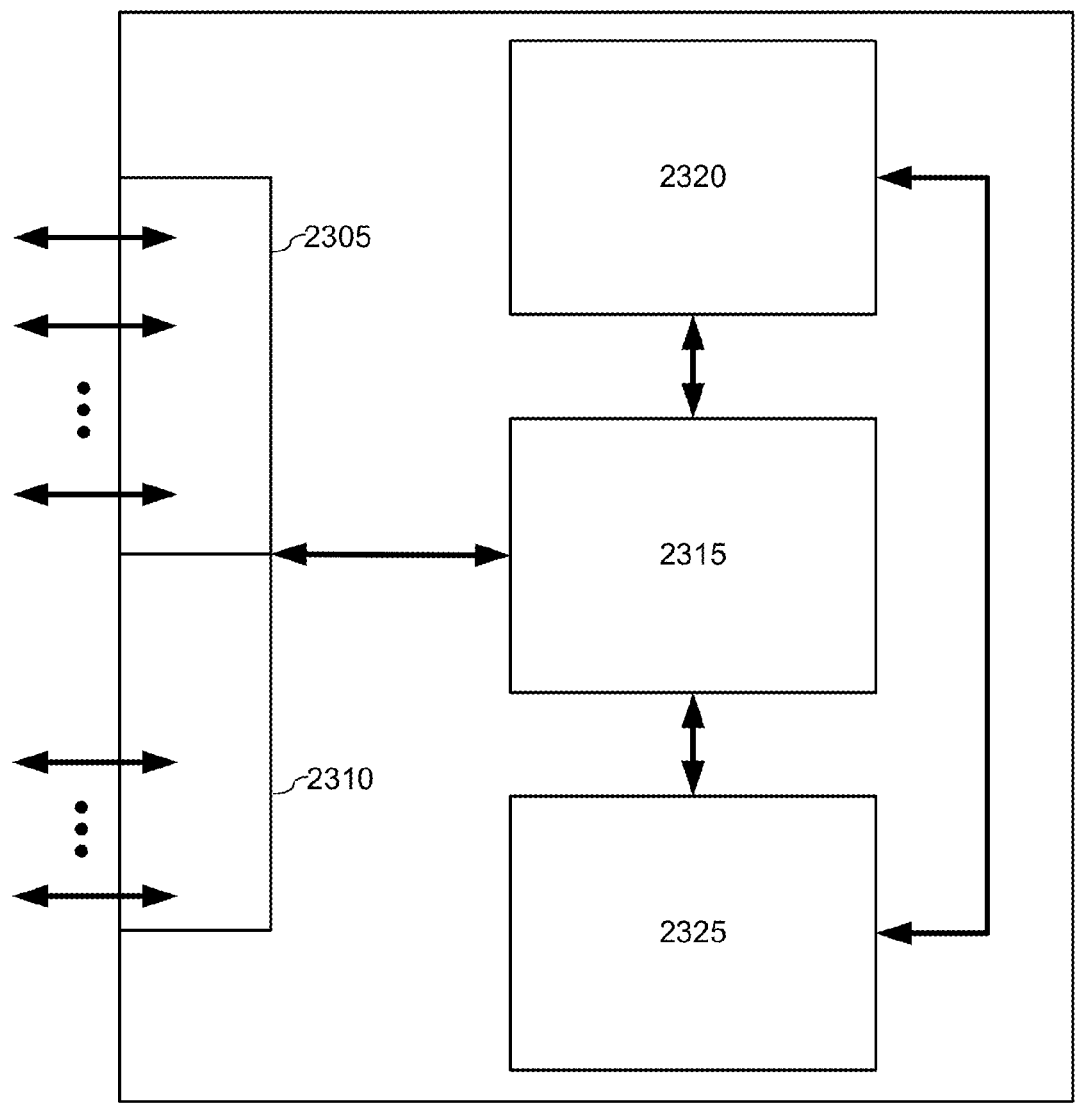
FIG. 23 depicts a block diagram of an exemplary information handling system node according to embodiments of the present invention.

FIG. 23 depicts a block diagram of an exemplary information handling system node according to embodiments of the present invention. It will be understood that the functionalities shown for switch 2300 may operate to support various embodiments of a node in an N-Node VLT system—although it shall be understood that a node in an N-Node VLT system may be differently configured and include different components. The node 2300 may include a plurality of I/O ports 2305, a data processing and fabric component 2315, tables 2320, and a switch control functionality portion 2325. In embodiments, the I/O ports 2305 are connected to one or more switches or other client devices, at least some of which form VLT LAGs. In addition, one or more ports are connected via inter-node links 2310 to other information handling system nodes in the n-node VLT system. The data processing functionality 2315 may use information included in the network data received at the node 2300, as well as information stored in the tables 2320, including fabric-level and node-level tables, to identify a next hop for the network data, among other possible activities. In embodiments, the switching fabric then schedules the network data for propagation through the node to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A method for handing a failure of a link of a virtual link trunking (VLT) group in a n-node VLT system that comprises a plurality of nodes communicatively coupled via inter-node links (INLs) and at least some of the plurality of nodes of the n-node VLT system being communicatively coupled via one or more input/output (I/O) ports to one or more client devices to form one or more VLTs, the method comprising:
   responsive to a VLT link failure of a VLT on a first node being detected:
      assigning the first node as a topology-change-owner node, the first node performing the steps comprising:
         determining one or more topology tables entries that require ownership change; and
         sending one or more messages to one or more nodes in the n-node VLT system to assume ownership for a certain table entry or entries; and
      responsive to the first node having no links for the VLT being operational on the first node as a result of the VLT link failure:
         computing an assigned node for the first node, an assigned node being a node in the n-node VLT system has an active link or links for the VLT, wherein data traffic that is intended for the VLT and received at the first node is sent via an INL to the assigned node for egress; and
         updating one or more port block masks for the n-node VLT system to avoid loops; and
      synchronizing topology tables entry or entries that have changed as a result of the VLT link failure to maintain a consistent representation across all nodes in the n-node VLT system.

2. The method of claim 1 wherein the one or more port block masks are part of one or more topology tables and the one or more topology tables further comprising:
   a virtual link trunking (VLT) membership table that comprises a listing of which nodes in the n-node VLT system participate in which of the one or more VLTs;
   an assigned node table that comprises an assigned node for each node that may receive ingress traffic on the node that is destined for a VLT that does not have a link on the node but does have a link or links on one or more of the other nodes in the n-node VLT system, the assigned node having a link for the VLT;
   a VLT-to-INL table that, for a node, maps a VLT to an inter-node link (INL) based upon the assigned node for the node; and
   a system-wide egress mask table that comprises, for each assigned node assignment, a mapping of allowed VLT egress for data ingressing on a specific INL between network nodes in the n-node VLT system.

3. The method of claim 2 wherein the one or more topology tables, upon synchronization, are common to all nodes in the n-node VLT system.

4. The method of claim 1 wherein the first node performs the steps of:
   computing an assigned node for the first node; and
   updating one or more port block masks for the n-node VLT system to avoid loops.

5. The method of claim 1 wherein one or more of the nodes in the n-node VLT system pre-computes updates in anticipation of failure of the VLT link.

6. The method of claim 1 wherein one or more of the nodes sends a status update message to one or more of the other nodes in the n-node VLT system to detect a VLT link failure.

7. The method of claim 1 further comprising:
responsive to the VLT link on the first node being restored, assigning the first node as a topology-change-owner node, the first node performing the steps comprising:
reverting the updated one or more port block masks for the n-node VLT system and the assigned node back their states before the VLT link failure; and
opening existing port blocks that were affected after the reverted one or more port block masks have been successfully installed first.

8. A method for handing a failure of an inter-node link (INL) of a virtual link trunking (VLT) group in a n-node VLT system that comprises a plurality of nodes communicatively coupled via inter-node links (INLs) and at least some of the plurality of nodes of the n-node VLT system being communicatively coupled via one or more input/output (I/O) ports to one or more client devices to form one or more VLTs, the method comprising:
responsive to detecting an INL failure between a first node and a second node in the n-node VLT system:
selecting one of the first and second nodes to be removed from the n-node VLT system based upon one or more criteria;
disabling VLT ports at the node that is to be removed from the n-node VLT system according to rules comprising:
responsive to a VLT having as its only member the node that is to be removed from the n-node VLT system, retaining that VLT at that node; and
responsive to a VLT having more node members including the node that is to be removed from the n-node VLT system, disabling that VLT at the node that is to be removed from the n-node VLT system;
disabling all INL ports, except one, at the node that is to be removed from the n-node VLT system, the one INL port that is retained being selected based upon one or more criteria; and
removing the selected node from the n-node VLT system in order to operate, based upon table programming, including port block mask, as a normal switch connected to one of the nodes in the n-node VLT system.

9. The method of claim 8 further wherein the table programming comprises:
a virtual link trunking (VLT) membership table that comprises a listing of which nodes in the n-node VLT system participate in the one or more VLTs;
an assigned node table that comprises an assigned node for each node that may receive ingress traffic on the node that is destined for a VLT that does not have a link on the node but does have a link or links on one or more of the other nodes in the n-node VLT system, the assigned node having a link for the VLT;
a VLT-to-INL table that, for a node, maps a VLT to an inter-node link (INL) based upon the assigned node for the node; and
a system-wide egress mask table that comprises, for each assigned node assignment, a mapping of allowed VLT egress for data ingressing on a specific INL between network nodes in the n-node VLT system.

10. The method of claim 9 further comprising:
updating the assigned node table as a result of the INL failure and the removal of the selected node.

11. The method of claim 10 further comprising:
to avoid potential loops, opening existing port blocks only after new blocks are first installed.

12. The method of claim 9 further comprising:
assigning the node that is retained in the n-node VLT system as a topology-change-owner node.

13. The method of claim 12 wherein:
the topology-change-owner node changes ownership of affected table entries to a node in the n-node VLT system according to one or more criteria.

14. The method of claim 13 wherein the one or more criteria comprises selecting, for an affected table entry, the node that has a lowest MAC address.

15. The method of claim 9 wherein the table programming, upon synchronization, are common to all nodes in the n-node VLT system.

16. The method of claim 8 further comprising:
responsive to the INL between the first and second nodes being restored:
assigning a node as a topology-change-owner node;
reverting the VLT ports and table programming to their states as they were before the VLT link failure; and
returning the node that was removed from the n-node VLT system back to the n-node VLT system, wherein existing port blocks that were affected are opened after the reverted table programming has been successfully installed first.

17. A method for handing a failure of a node in a n-node virtual link trunking (VLT) system that comprises a plurality of nodes communicatively coupled via inter-node links (INLs) and at least some of the plurality of nodes of the n-node VLT system being communicatively coupled via one or more input/output (I/O) ports to one or more client devices to form one or more VLTs, the method comprising:
responsive to a node failure being detected:
assigning one of the remaining nodes in the n-node VLT system as a topology-change-owner node, the topology-change-owner node performing the steps comprising:
determining one or more topology tables entries that require ownership change; and
sending one or more messages to one or more nodes in the n-node VLT system to assume ownership for a certain table entry or entries;
computing assigned nodes for the remaining nodes in the n-node VLT system, an assigned node being a node in the n-node VLT system has an active link or links for a VLT, wherein data traffic that is intended for the VLT and received at the first node is sent via an INL to the assigned node for egress;
updating one or more port block masks for the n-node VLT system to avoid loops; and
synchronizing topology tables entry or entries that have changed as a result of the node failure to maintain a consistent representation across the remaining nodes in the n-node VLT system.

18. The method of claim 17 wherein the one or more port block masks are part of one or more topology tables and the one or more topology tables further comprise:
a virtual link trunking (VLT) membership table that comprises a listing of which nodes in the n-node VLT system participate in the one or more VLTs;
an assigned node table that comprises an assigned node for each node that may receive ingress traffic on the node that is destined for a VLT that does not have a link on the node but does have a link or links on one or more of the other nodes in the n-node VLT system, the assigned node having a link for the VLT;

a VLT-to-INL table that, for a node, maps a VLT to an inter-node link (INL) based upon the assigned node for the node; and a system-wide egress mask table that comprises, for each assigned node assignment, a mapping of allowed VLT egress for data ingressing on a specific INL between network nodes in the n-node VLT system.

19. The method of claim 17 wherein one or more of the nodes in the n-node VLT system pre-computes updates in anticipation of failure of the VLT link.

20. The method of claim 17 further comprising:

responsive to the node being restored:
  assigning a node as a topology-change-owner node;
  reverting the updated one or more port block masks for the n-node VLT system and the assigned node back their states before the node failure; and opening existing port blocks that were affected after the reverted one or more port block masks have been successfully installed first.

\* \* \* \* \*